United States Patent
Koros et al.

(10) Patent No.: US 9,999,861 B2
(45) Date of Patent: Jun. 19, 2018

(54) CARBON MOLECULAR SIEVE MEMBRANES FOR NITROGEN/METHANE SEPARATION

(71) Applicant: Georgia Tech Research Corporation, Atlanta, GA (US)

(72) Inventors: William John Koros, Atlanta, GA (US); Xue Ning, Atlanta, GA (US)

(73) Assignee: GEORGIA TECH RESEARCH CORPORATION, Atlanta, GA (US)

( * ) Notice: Subject to any disclaimer, the term of this patent is extended or adjusted under 35 U.S.C. 154(b) by 0 days. days.

(21) Appl. No.: 14/439,160

(22) PCT Filed: Oct. 29, 2013

(86) PCT No.: PCT/US2013/067334
§ 371 (c)(1),
(2) Date: Apr. 28, 2015

(87) PCT Pub. No.: WO2014/070789
PCT Pub. Date: May 8, 2014

(65) Prior Publication Data
US 2015/0290596 A1    Oct. 15, 2015

Related U.S. Application Data

(60) Provisional application No. 61/719,683, filed on Oct. 29, 2012.

(51) Int. Cl.
*B01D 71/02* (2006.01)
*B01D 71/64* (2006.01)
(Continued)

(52) U.S. Cl.
CPC ........... *B01D 71/64* (2013.01); *B01D 53/228* (2013.01); *B01D 67/0002* (2013.01);
(Continued)

(58) Field of Classification Search
CPC ........... B01D 53/228; B01D 2053/221; B01D 67/0067; B01D 71/021; B01D 2256/245; B01D 2257/102; C10L 3/105
See application file for complete search history.

(56) References Cited

U.S. PATENT DOCUMENTS

| | | | | |
|---|---|---|---|---|
| 4,685,940 A * | 8/1987 | Soffer | ................. | B01D 71/021 423/445 R |
| 6,395,066 B1* | 5/2002 | Tanihara | ................ | B01D 53/22 95/47 |
| 6,632,849 B1* | 10/2003 | Yao | .................... | B01D 67/0067 264/43 |
| 2002/0053284 A1 | 5/2002 | Koros et al. | | |

(Continued)

FOREIGN PATENT DOCUMENTS

SG    181276    6/2012

OTHER PUBLICATIONS

Extended European Search Report for EP13852158.8, dated May 17, 2016 (6 pages).
(Continued)

*Primary Examiner* — Jason M Greene
(74) *Attorney, Agent, or Firm* — McAndrews, Held & Malloy, Ltd.

(57) ABSTRACT

The various embodiments of the disclosure relate generally to carbon molecular sieve membranes (CMSM) and their associated fabrication processes for the separation of nitrogen/methane gas mixtures, and more particularly to CMSM that maintain high nitrogen-methane selectivity and high gas permeabilities. Methods for removing nitrogen from a nitrogen methane mixture gas via the use of the CMS membranes and gas enrichment devices using the same are also disclosed.

11 Claims, 8 Drawing Sheets

(51) Int. Cl.
*B01D 53/22* (2006.01)
*B01D 67/00* (2006.01)
*B01D 69/02* (2006.01)
*C10L 3/10* (2006.01)
*B29C 71/02* (2006.01)
*B29K 79/00* (2006.01)
*B29L 31/00* (2006.01)

(52) U.S. Cl.
CPC ......... *B01D 67/0067* (2013.01); *B01D 69/02* (2013.01); *B01D 71/021* (2013.01); *B29C 71/02* (2013.01); *C10L 3/105* (2013.01); *B01D 2053/221* (2013.01); *B01D 2256/245* (2013.01); *B01D 2257/102* (2013.01); *B01D 2325/20* (2013.01); *B29K 2079/08* (2013.01); *B29L 2031/755* (2013.01)

(56) References Cited

U.S. PATENT DOCUMENTS

| | | | |
|---|---|---|---|
| 2005/0235825 A1* | 10/2005 | Tin | B01D 53/228 95/45 |
| 2011/0100211 A1* | 5/2011 | Kiyono | B01D 53/228 95/45 |
| 2011/0192281 A1* | 8/2011 | Hosseini | B01D 67/0006 96/10 |
| 2013/0333562 A1* | 12/2013 | Koros | B01D 53/228 95/50 |

OTHER PUBLICATIONS

International Search Report for PCT/US13/67334, dated Mar. 2014 (2 pages).

* cited by examiner

CARBON MOLECULAR SIEVE MEMBRANES FOR NITROGEN/METHANE SEPARATION

CROSS-REFERENCE TO RELATED APPLICATIONS

This application is a U.S. national stage entry of PCT/US2013/067334, filed on 29 Oct. 2013, which claims the benefit of U.S. Provisional Application Serial No. 61/719,683, filed on 29 Oct. 2012, entitled "Carbon Molecular Sieve Membranes derived from Polyimides for Nitrogen/Methane Separation." The contents of each application identified in this paragraph is incorporated herein by reference in its entirety as if fully set forth below.

TECHNICAL FIELD

The various embodiments of the disclosure relate generally to carbon molecular sieve membranes (CMSM) and their associated fabrication processes, and more particularly to CMSM that separate nitrogen and methane.

BACKGROUND

Many natural gas reserves are highly contaminated by nitrogen, which has to be removed to meet pipeline specifications (nitrogen below 3%). Nitrogen rejection technology is also required in some chemical refineries where methane stream has to be purified before certain processes like steam reforming. Nitrogen removal from natural gas is a difficult and expensive process. It is estimated that nitrogen removal is more challenging and costly than corresponding carbon dioxide removal from coal bed methane. Currently there are four available nitrogen rejection technologies— cryogenic distillation, pressure swing adsorption (PSA), liquid-based absorption, and membrane separation ($CH_4$-selective). Among them, only cryogenic distillation is a mature technology that has been commercially used on large scale. Although the cryogenic process has the highest methane recovery rate (about 98%), the complexity of pretreatment and high energy consumption make it less attractive for small throughputs. PSA and liquid absorption processes are better suited for small throughputs (<10 MMscfd) with relatively high nitrogen concentration. But both processes are capital intensive. Membrane technology is an attractive alternative compared to other separation technologies by virtue of its high adaptability, high reliability, low energy consumption, and low capital cost in installation, operation and maintenance. It utilizes the "free" well pressure as the driving force and separates enriched fast and slow gases into permeate and retentate streams respectively. With its modular nature and good space efficiency, membrane gas separation is especially attractive to small and remote sites.

The future growth of natural gas consumption and depletion of conventional resources will promote the development of low quality natural gas (LQNG) reserves, which account for almost one-third of known gas reserves in the US. Such LQNG contains excessive amounts of gas other than methane, mostly nitrogen, carbon dioxide, and hydrogen sulfide. It has been estimated that approximately 17% of the natural gas reserves in the US are sub-quality due to high levels of nitrogen (typically 5% to 40%). Moreover, considerable amount of nitrogen-rich natural gas (NRNG) reserves (with 10 to 85% $N_2$) exist in many different regions in the world. Apart from the natural existence, nitrogen contamination can also be artificially introduced by nitrogen fracturing during some shale gas production processes. In such case, nitrogen content can reach as high as 50% at the start of work-up and then decline to 6-10%. The NRNG needs to be upgraded before it is sent to the commercial natural gas pipeline. The US natural gas pipeline specification typically limits nitrogen to be below 3%.

BRIEF SUMMARY

The various embodiments of the disclosure relate generally to carbon molecular sieve membranes and their associated fabrication processes, and more particularly to CMSM that separate nitrogen from methane.

An embodiment of the disclosure can be a gas separation membrane of nitrogenmethane separation. The gas separation membrane can include a carbon molecular sieve. The gas separation membrane has a nitrogenmethane selectivity of at least about 5.0, and a nitrogen permeability of at least about 3.0 Barrers at 35° C. and 65 psia for pure nitrogen and pure methane streams. In some embodiments, the carbon molecular sieve can be a pyrolyzed polymer precursor membrane of a polyimide having at least about 60 wt % carbon content and a hydrogen content of less than about 5% wt.

In some embodiments, the gas separation membrane can have a nitrogenmethane selectivity of at least about 5.5 or at least about 6. In some embodiments, the gas separation membrane can have a nitrogen permeability that is at least about 3.9 Barrers, at least about 4 Barrers, or at least about 5 Barrers.

In some embodiments, the gas separation membrane can include the carbon molecular sieve of a pyrolyzed polymer precursor membrane selected from

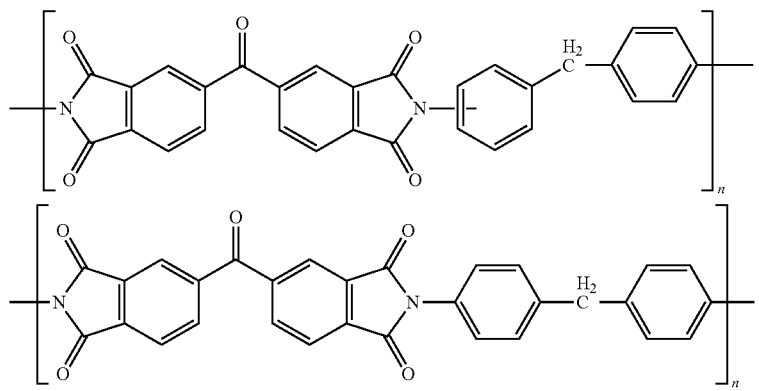

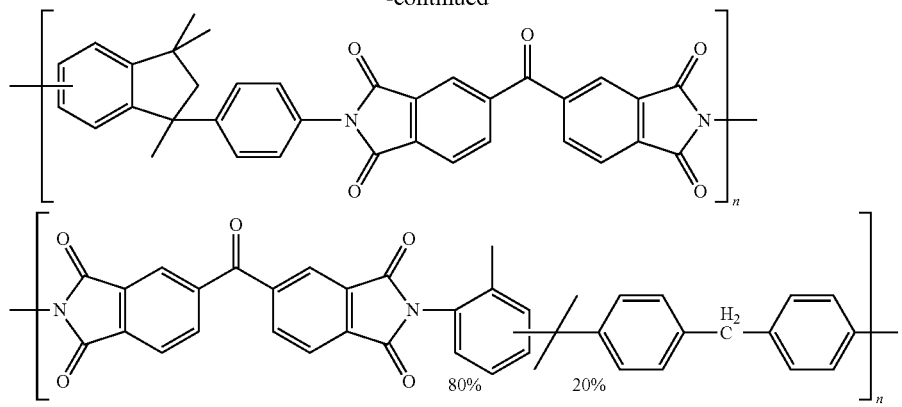

Another embodiment of the disclosure can be a process for forming a nitrogenmethane separation carbon membrane. The process can include subjecting a polymer precursor membrane to a pyrolysis temperature of at least about 675° C. in an inert atmosphere. The polymer precursor membrane can be a polyimide having at least about 60 wt % carbon content and a hydrogen content of less than about 5% wt. In some embodiments, the pyrolysis temperature can be at least about 700° C., or at least about 750° C., or at least about 800° C. In other embodiments, the polymer precursor membrane does not contain fluorine. In an embodiment, the inert atmosphere for pyrolysis is argon, or ultrahigh purity argon.

In an embodiment, the process can produce a carbon membrane having a nitrogenmethane selectivity of at least 5, or a nitrogenmethane selectivity of at least 6. In some embodiments, the process can product a carbon membrane having a nitrogen permeability that is at least about 3.9 Barrers, at least about 4 Barrers, or at least about 5 Barrers. In some embodiments, the polymer precursor membrane in the pyrolysis can be a polyimide selected from

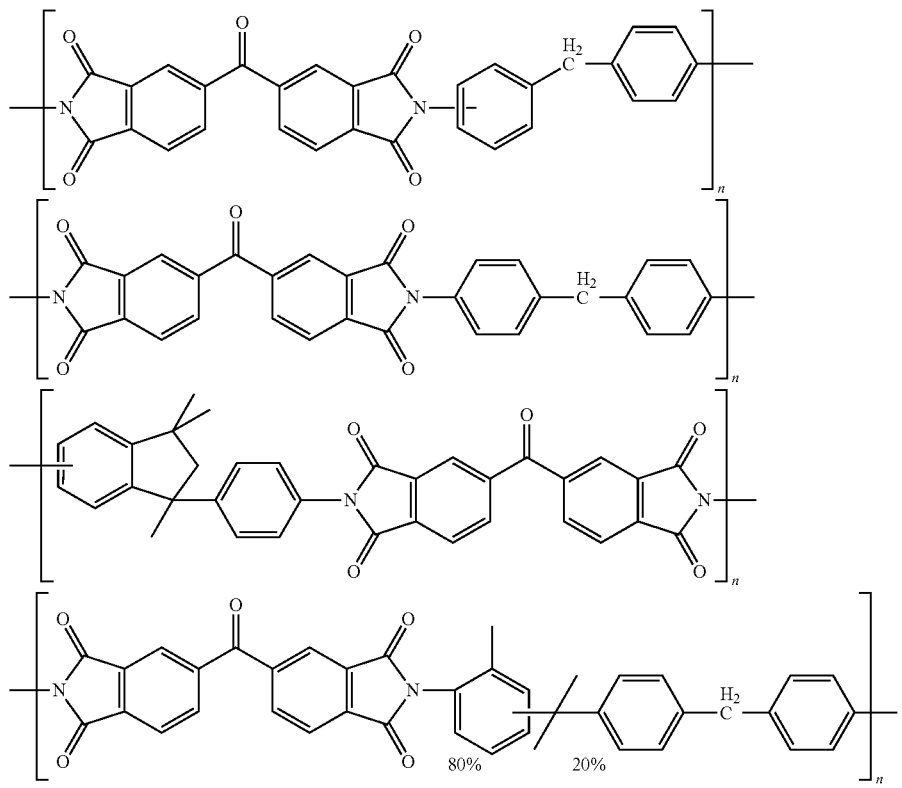

or any combination thereof, as a polymer blend or copolymer.

An embodiment of the disclosure can be a gas enrichment device, the device having a nitrogenmethane gas stream inlet, a nitrogen-enriched gas stream outlet, a nitrogen-depleted gas stream outlet, and a carbon molecular sieve membrane interposed between the gas stream inlet and the nitrogen-depleted stream outlet on one side of the membrane and the nitrogen-enriched gas stream outlet on the other side. The carbon molecular sieve can have a nitrogenmethane selectivity of at least about 5.0 and a nitrogen permeability of at least about 3 Barrers at 35° C. and 65 psia in pure nitrogen and pure methane streams. The carbon molecular sieve can be a pyrolyzed polymer precursor membrane of a polyimide having at least about 60 wt % carbon content and a hydrogen content of less than about 5% wt. The nitrogen-methane selectivity can be at least about 5.5, or at least about 6, and the nitrogen permeability can be at least about 3.9 Barrers, at least about 4 Barrers, or at least about 5 Barrers.

An embodiment of the disclosure can also be a method for decreasing the nitrogen content of a nitrogenmethane gas mixture. The method can include contacting the mixture with a gas separation membrane, and separating two gas streams at the membrane, wherein the gas separation membrane is as described above.

DETAILED DESCRIPTION

Figure 1:
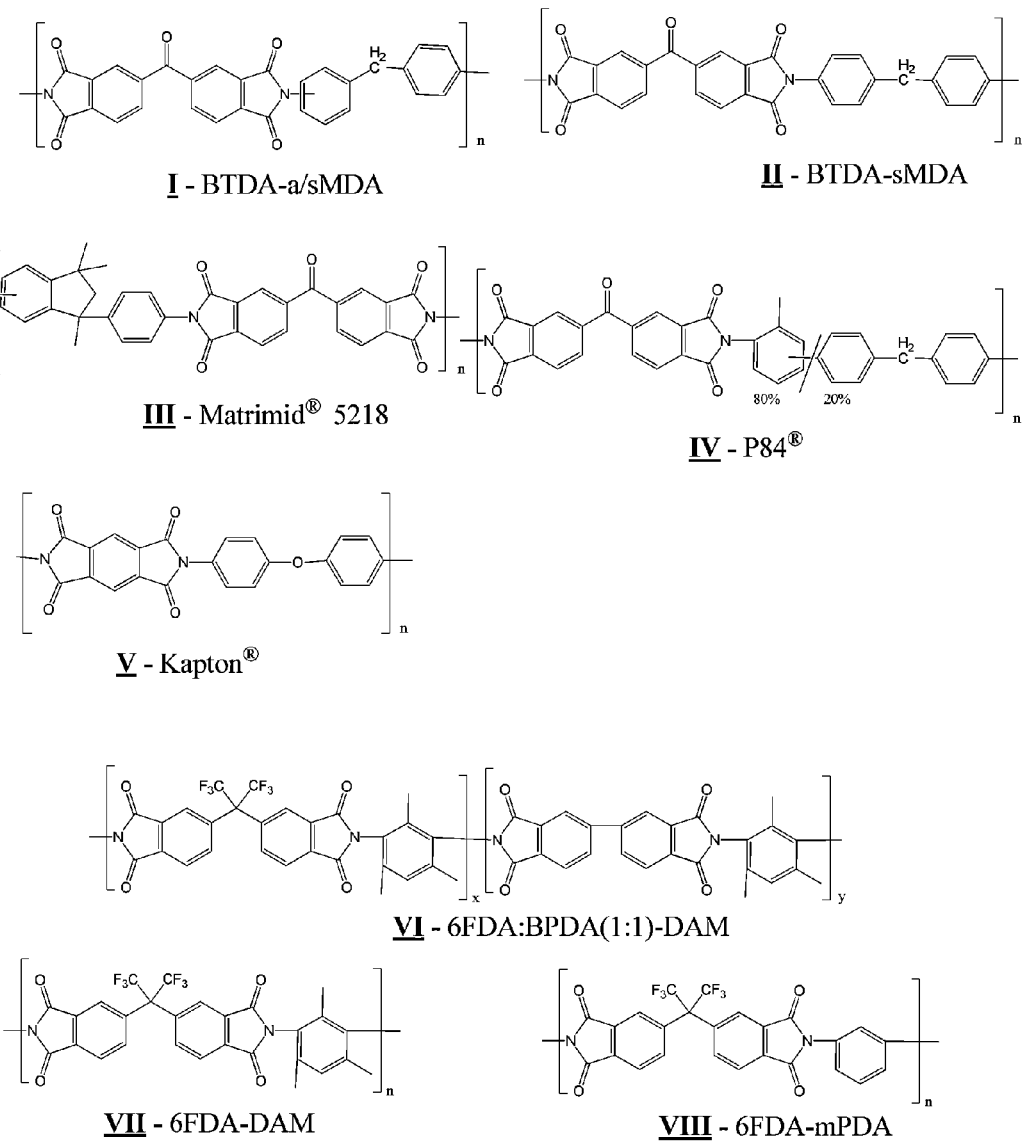
FIG. 1 illustrates structures of polyimides in carbon molecular sieve (CMS) membrane fabrication, in accordance with an exemplary embodiment of the disclosure.

Although preferred embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. The disclosure is capable of other embodiments and of being practiced or carried out in various ways. Also, in describing the preferred embodiments, specific terminology will be resorted to for the sake of clarity.

It must also be noted that, as used in the specification and the appended claims, the singular forms "a," "an" and "the" include plural referents unless the context clearly dictates otherwise.

Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" one particular value andor to "about" or "approximately" another particular value. When such a range is expressed, another embodiment includes from the one particular value andor to the other particular value.

By "comprising" or "comprising" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Membranes with high selectivity for separating nitrogen and methane have been developed that provide substantial improvements in selectivity and permeability compared to previous efforts. This disclosure describes the CMS membranes for nitrogenmethane separation, methods of preparing the CMS membranes, methods of using the CMS membranes, and devices that incorporate the CMS membranes.

Gas transport through non-porous polymers and molecular sieves is commonly described via the "solution-diffusion" mechanism. Gas molecules sorb into the membrane at the high pressure upstream, then diffuse through the membrane under the influence of a chemical potential gradient, and finally desorb from the membrane at the low pressure downstream side. With this mechanism, permeability of a membrane for a certain gas can be expressed as a product of a thermodynamic factor called sorption coefficient, S, and a kinetic factor called the diffusion coefficient, D. And the permselectivity is a product of sorption selectivity and diffusion selectivity. For all membrane materials that have been reported, the sorption coefficient of $CH_4$ is always larger than that of $N_2$ due to the higher condensability of $CH_4$. Thus sorption effect enables $CH_4$ to permeate faster. However, the diffusion coefficient of $N_2$ is larger than that of $CH_4$ in all kinds of membrane materials due to the smaller kinetic diameter of $N_2$, which means diffusion coefficient enables $N_2$ to permeate faster. With the effects of sorption and diffusion opposed to each other, there are two types of membranes for $N_2$/$CH_4$ separation—$N_2$-selective membranes with stronger diffusion selection effect and $CH_4$-selective membranes with stronger sorption selection effect. For rubbery polymer materials, a broad distribution of segmental motions produces a correspondingly broad distribution of transient intersegmental gap sizes and poor distinguishability of gas molecule sizes and shapes. The membranes fabricated from them are usually $CH_4$-selective. For glassy polymers, limited mobility of polymer segments leads to a relatively narrow distribution of effective transient intersegmental gap sizes and better distinguishability of gas molecule sizes and shapes. The membranes fabricated from them are usually $N_2$-selective. MTR Inc. has been developing $CH_4$-selective rubbery polymer membrane systems for $N_2$ removal from natural gas. They have achieved a $CH_4$/$N_2$ selectivity of 3 at ambient temperature. This disclosure focuses on $N_2$-selective membranes which attempt to maximize the diffusion-selection effect. With $N_2$ passing through the membrane and $CH_4$ rejected, the wellhead pressure of $CH_4$ can be largely preserved and the cost of recompression in a $CH_4$-selective membrane system can be saved.

The technologies of nitrogenmethane separation traditionally included cryogenic distillation, liquid absorption, solid adsorption, and methane-selective membrane separation. In contrast, this disclosure describes a class of nitrogen-selective membranes to remove nitrogen from methane. Compared to other technologies, membrane separation has lower energy consumption and lower capital cost in installation, operation and maintenance. Compared to methane-selective membranes, nitrogen-selective membranes described in this work can largely preserve the wellhead pressure of methane, since nitrogen permeates through the membrane and methane is rejected at the retentate side of the membrane. Thus the cost of recompression of purified methane stream can be saved.

Figure 2:
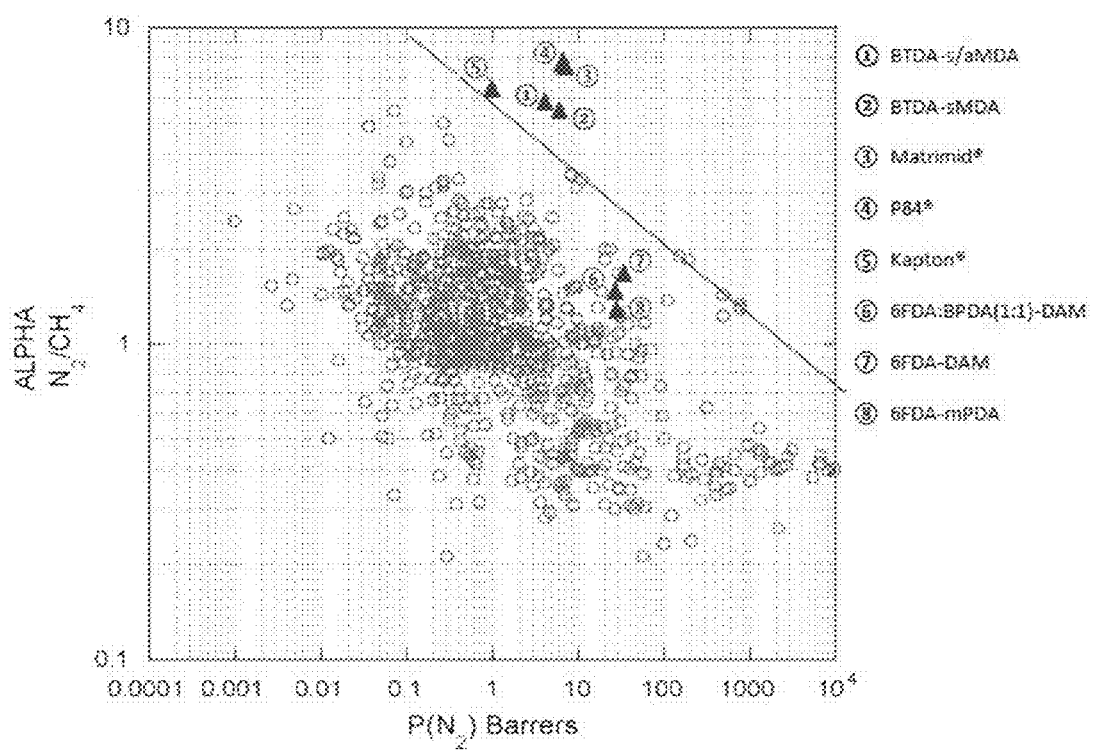
FIG. 2 illustrates $N_2$/$CH_4$ Separation performance of CMS membranes (with legend on right) plotted with data of polymer membranes from literature (red circles) and the Robeson line, in accordance with exemplary embodiments of the disclosure.

Polymer-based $N_2$-selective membrane separation for $N_2$/$CH_4$ has not been pursued widely. This is because that the broad distribution of segmental motions of polymer chains leads to low permselectivity for $N_2$/$CH_4$. Also, there is a strong trade-off effect between productivity (represented by permeability) and efficiency (represented by selectivity) as shown in the upper bound line for $N_2$/$CH_4$ drawn by Robeson (see FIG. 2). The separation performance of all traditional polymer membranes lies either below or on the upper bound line.

Membrane technology is an attractive alternative to other separation technologies by virtue of its potentially high adaptability, low energy consumption, and low capital cost. With its modular nature and good space efficiency, membrane based gas separation is especially attractive to small and remote sites; however, the competing effect between diffusion and sorption terms poses a challenge for membrane technology to separate $N_2$ and $CH_4$. Nitrogen is smaller (kinetic diameters: 3.64 Å vs. 3.8 Å) but less condensable than $CH_4$ (critical temperatures: 126 K vs. 191 K). These properties make $N_2$ permeate faster than $CH_4$ in membranes with effective diffusion selection abilities, while $CH_4$ permeates faster in membranes with stronger sorption selection effect. Most rubbery polymeric membranes are slightly $CH_4$-selective, since flexible chains in rubbery polymer provide very small $N_2$/$CH_4$ diffusion selectivity; therefore $CH_4$/$N_2$ solubility selectivity dominates permselectivity. The highest $CH_4$/$N_2$ permselectivity of $CH_4$-selective membranes has been achieved around 3~4 at ambient temperature. Although the flux is high for this membrane system, loss of high well-head pressure of the permeate requires additional costs for recompression. In 1987, Kim and Koros et al. identified polyimides with "reverse selectivity", i.e., $N_2$ permeates preferentially rather than $CH_4$. With $CH_4$ rejected to the high pressure retentate stream, the advantage of saving recompression cost is significant. Unfortunately, the best performing $N_2$-selective glassy polymer membranes with acceptable $N_2$ permeability only provide a $N_2$/$CH_4$ permselectivity ~3, which is marginal for economical separations. Although glassy polyimide membranes have limited mobility of polymer segments, the diffusion selection effect is insufficient to distinguish the small size and shape difference between $N_2$ and $CH_4$. As a result, a more rigid membrane structure with appropriate pore size and shape is required to fully utilize the size and shape difference between $N_2$ and $CH_4$ to provide the required diffusion selectivity and overcome the higher sorption of $CH_4$ vs. $N_2$.

Carbon molecular sieve (CMS) membranes, pyrolyzed from polymer precursors under controlled conditions have shown attractive separation performance for several gas pairs. CMS hollow fiber membranes have also been proved stable for high pressure feeds up to 1000 psi, (1 psi=0/006895 bar) without showing plasticization that are commonly encountered in polymer membranes. However, only a few researchers have reported $N_2$ permeation data of CMS membranes, and most of them did not focus on $N_2$/$CH_4$ separation, but rather on $O_2$/$N_2$ and $CO_2$/$CH_4$ separation. The reported data for these CMS membranes showed $N_2$/$CH_4$ permselectivity in the range of 1 to 4 but two cases had higher permselectivity. Steel et al. prepared Matrimid® derived CMS membrane at 800° C. under vacuum and achieved $N_2$/$CH_4$ permselectivity of 5.89 with $N_2$ permeability of 1.86 Barrers. Hosseini et al. fabricated CMS membrane pyrolyzed from PBIMatrimid® (25/75 wt. %) blend polymers (vacuum, 800° C.) and achieved $N_2$/$CH_4$ permselectivity of 7.99 with $N_2$ permeability of 3.78 Barrers.

Several polyimide polymers as the precursors for CMS membranes are described herein. Polyimides are chosen due to their outstanding properties such as high glass transition temperatures, good processability, good mechanical strength, high carbon yields, and low shrinkage. The polyimides can be pyrolyzed under inert atmosphere, including under ultra high purity (UHP) argon, with temperature gradually increased to 800° C. and soaked at this final temperature for 2 hr. The high pyrolysis temperature (above 675° C.) is critical to achieve high $N_2$/$CH_4$ selectivity. Higher pyrolysis temperature usually leads to lower permeability and higher selectivity of CMS membranes, because graphene-like sheets begin to align parallel on a short range and pack more closely to each other as temperature increases. The difference of kinetic diameters of $N_2$ and $CH_4$ is very small (3.64 Å vs. 3.80 Å). Thus increasing pyrolysis temperatures helps to decrease the size of ultramicropores to approach the sizes of gas molecules and highly improve the molecular sieving effect. Apart from the small size difference, the counter effect of sorption competition is another challenge for the membrane separation of $N_2/CH_4$. The sorption coefficient of $CH_4$ is much higher than that of $N_2$ due to the higher condensability of $CH_4$. Thus the diffusion selectivity has to be high enough to overcome the low sorption selectivity to achieve a satisfying overall permselectivity.

In an embodiment, CMS membranes can be used as a gas separation membrane for separating nitrogen and methane. The gas separation membrane can contain a CMS with a nitrogen:methane selectivity of at least about 5.0, and a nitrogen permeability of at least about 3.0 Barrers. The nitrogen:methane selectivity can be at least about 5.5, at least about 6.0, at least about 6.5, or at least about 7.0. The nitrogen permeability can be at least 3.5 Barrers, at least about 3.9 Barrers, at least about 4.0 Barrers, at least about 5.0 Barrers, at least about 5.5 Barrers, or at least about 6.0 Barrers. In some embodiments, the nitrogen permeability can be at least about 3.5 Barrers and the nitrogen:methane selectivity at least about 6.0, the nitrogen permeability can be at least about 5.0 Barrers and the nitrogen:methane selectivity at least about 5.5, the nitrogen permeability can be at least about 6.0 Barrers and the nitrogen/methane selectivity at least about 7.0, or the nitrogen permeability can be at least about 6.0 Barrers and the nitrogen:methane selectivity at least about 7.5. The nitrogen permeability can be up to about 50 Barrers and the nitrogen/methane selectivity can be up to about 30.

Values are measured at 35° C. and 65 psia for pure nitrogen and pure methane streams.

While the need for nitrogen:methane separation is highly desirable, and current results have achieved the surprising ranges above, early efforts to create CMS membranes that separated nitrogen and methane have failed to produce both a highly selective membrane that also exhibited acceptable permeability. Early efforts focused on materials that had shown excellent results in other gas pairings, including for example the 6FDA imides, structures VI-VIII, shown in FIG. 1. However, a variety of efforts to develop these previously successful materials did not lead to a suitable material, often yielding good to excellent permeability, but almost no selectivity for nitrogen and methane. Similar efforts to apply a dual temperature secondary oxygen doping strategy previously described by this group also did not lead to a suitable material. Surprisingly, by switching to a more traditional material and optionally avoiding materials that exhibited fluorine groups, the pyrolysis could be tailored to produce a product that achieves selectivity and permeability never before demonstrated.

Thus, in an embodiment, the carbon molecular sieve membrane can be a pyrolyzed polymer precursor membrane. The polymer precursor membrane can be a polyimide, preferably a polyimide with a high fraction of carbon atoms are $sp^2$ hybridized atoms, or more specifically an aromatic polyimide wherein the portion of atoms are conjugated with an aromatic ring. In an embodiment, the fraction of carbon atoms that are $sp^2$ hybridized is at least about 70 atom %, at least about 75 atom %, or at least about 80 atom %. In another embodiment, the portion of atoms conjugated to an aromatic ring can be at least about 45 atom %, or at least about 50 atom %.

In another embodiment, the polyimide can be described based on the amount of carbon and hydrogen present as its molecular weight. In another embodiment, the polyimide can be at least about 60 wt % carbon and less than about 5 wt % hydrogen, at least about 65% weight carbon and less than about 5 wt % hydrogen, or at least about 70 wt % carbon and less than about 5 wt % hydrogen.

By way of a nonlimiting example, the polyimide Matrimid, structure III in FIG. 1, has a molecular formula of approximately $C_{35}H_{24}N_2O_5$. The compound has about 76.1 wt % carbon and about 4.3 wt % hydrogen. About 82% of the carbons (29 out of 35) are $sp^2$ hybridized. About 54% of the atoms (29 carbons, 2 nitrogens, and 5 oxygens) are conjugated to, i.e. in it election conjugation, with an aromatic ring.

Based on work conducted using the previous 6FDA compounds, it also appears that the trifluoro methyl groups surprisingly change the reactivity of polyimides during pyrolysis in such a way that the final CMS membrane does not achieve the characteristics desired by the disclosure. Thus, in an embodiment, the polymer precursor does not contain a fluorine group in the structure.

In some embodiments, the polymer precursor membrane can be a polyimide selected from the group consisting of structures I-V, shown below

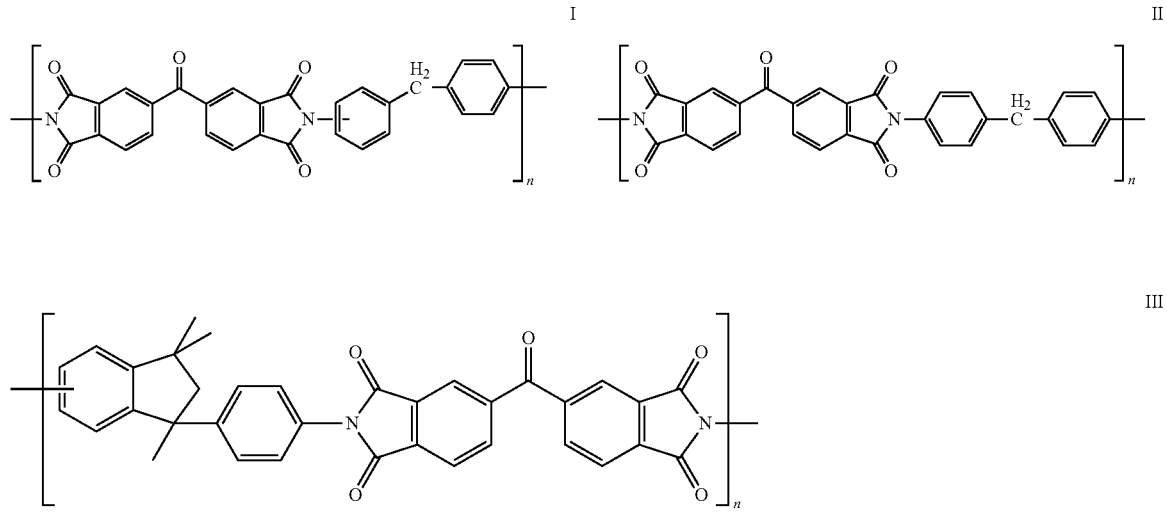

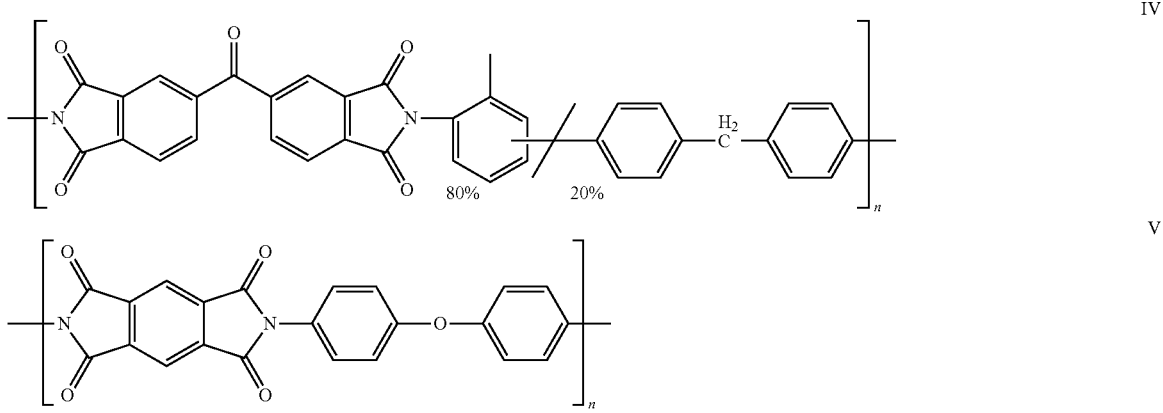

IV

V

In some preferred embodiments, the polyimide can be selected from the structures I, II, III or IV. In some embodiments, the polyimide can be selected from the structures III or IV. Moreover, while structures I-V are displayed as single polymer compositions, the polyimide used to produce that CMS membranes can also include combinations of the polyimides, as blends of two or more polyimides, or as a copolymer of two or more polyimides.

Alternatively, the polyimide can be prepared from an diacid anhydride and a aromatic diamine, such that the reaction would produce a polyimide having a structure that includes the imide IX or X, shown below:

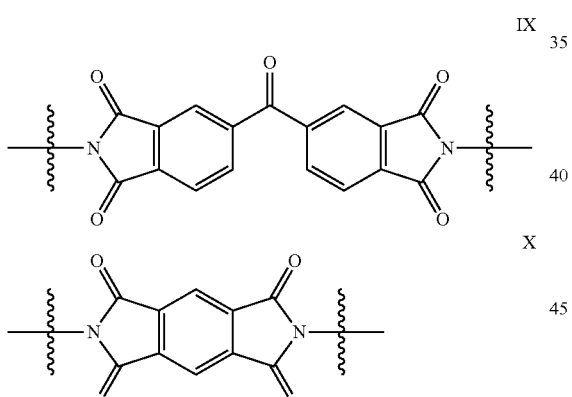

IX

X

Figure 3:
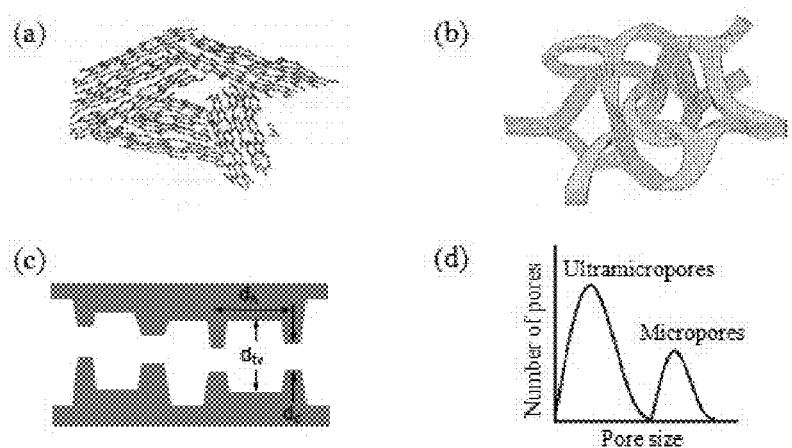
FIGS. 3(a) and 3(b) illustrate structure of pyrolytic carbon.
FIG. 3(c) illustrates idealized pore structure of CMS membrane.
FIG. 3(d) illustrates idealized bimodal pore size distribution of CMS membrane, with the notations correspond to $d_c$: ultramicropore dimension, $d_{t_N}$: size of adsorptive pore dimension, and $d_\lambda$: jump length dimension, in accordance with exemplary embodiments of the disclosure.

As discussed above, CMS membranes can be pyrolyzed from polymer membrane precursors under controlled atmosphere and temperature protocol. Without wishing to be bound by theory, during pyrolysis, scission and reorganization of polymer main chains occur, with small gas molecules released and free radicals formed. The free radicals then form interchain or intrachain crosslinking, giving rise to conjugated aromatic 3D network with graphene-like structure. As the pyrolysis temperature increases, $sp^2$ hybridized carbon sheet begin to align to form ordered structures on a short range. On the long range, these turbostratic structures are believed to be amorphous and isotropic as illustrated in FIG. 3(a, b). In FIGS. 3(a) and (b) are shown the structures of pyrolytic carbon, FIG. 3 (c) shows the idealized pore structure of CMS membrane, and FIG. 3 (d) shows the idealized bimodal pore size distribution of CMS membrane. In (c), the notations correspond to $d_c$: ultramicropore dimension, $d_{tv}$: size of adsorptive pore dimension, and $d_\lambda$: jump length dimension. 'Slit-like' pore structures are formed from packing imperfections between ordered regions, and a bimodal pore distribution can be used to describe CMS structures—'micropores' with size of 7 to 20 Å connected by molecular sieving 'ultramicropores' with sizes below 7 Å. This morphology enables high permeability and high selectivity at the same time [26].

Transport in CMS membranes can be described in terms of permeability and perselectivity, or selectivity. 'Permeability' and 'permselectivity' are two intrinsic properties to characterize the intrinsic productivity and separation efficiency of membranes. The 'permeability' of a membrane to gas A is defined as the pressure-and-thickness-normalized flux, given as $$P_A = \frac{N_A \cdot l}{\Delta p_A} \qquad (1)$$

where $N_A$ is molar flux of A, l is membrane thickness, and $\Delta p_A$ is the partial pressure difference between upstream and downstream for gas A. It is common to express permeability in Barrers, for which the units are given below.

$$1 \text{ Barrer} = 10^{-10} \frac{\text{cm}^2(STP) \cdot \text{cm}}{\text{cm}^2 \cdot s \cdot \text{cm}Hg} \qquad (2)$$

Gas transport through non-porous polymers and molecular sieves is commonly described via the 'solution-diffusion' mechanism. Gas molecules sorb into the membrane at the high pressure upstream, then diffuse through the membrane under the influence of a chemical potential gradient, and finally desorb from the membrane at the low pressure downstream side. Considering the sorption-diffusion nature of the process, permeability can be written as a product of a kinetic factor called the diffusion coefficient $D_A$, and a thermodynamic factor called the sorption coefficient $\mathcal{S}_A$.

$$P_A = D_A \cdot \mathcal{S}_A \qquad (3)$$

Due to their microporous nature, the sorption coefficient in CMS membranes can be described by Langmuir isotherm, viz.

$$\mathbb{S}_A = \frac{C_A}{p_A} = \frac{C'_{HA} b_A}{1 + b_A p_A} \quad (4)$$

where $C_A$ is the concentration of sorbed penetrant A, $p_A$ is the partial pressure, $C'_{HA}$ is the Langmuir hole-filling capacity and $b_A$ is the Langmuir affinity constant. For polymer materials, gas penetrants may sorb either into well packed Henry's law regions by dilation of the matrix, or into the preexisting gaps between polymer chain segments comprising Langmuir regions [28]. Thus the sorption in polymer membranes can be described by the following equation, $$\mathbb{S}_A = \frac{C_A}{p_A} = k_{DA} + \frac{C'_{HA} b_A}{1 + b_A p_A} \quad (5)$$

where $k_{DA}$ is the Henry's law coefficient.

The separation factor between gases A and B is defined as the ratio of permeate-side and feed-side mole fractions of A and B. When downstream pressure is held at vacuum, the separation factor equals to the intrinsic permselectivity of the membrane, $\alpha_{A/B}$ [27]. The permselectivity is also a product of diffusion selectivity $$\frac{D_A}{D_B}$$

and sorption selectivity $$\frac{\mathbb{S}_A}{\mathbb{S}_B},$$

so:

$$\alpha_{A/B} = \frac{(y_A/y_B)_{permeate}}{(x_A/x_B)_{feed}} = \frac{P_A}{P_B} = \frac{D_A}{D_B} \cdot \frac{\mathbb{S}_A}{\mathbb{S}_B} \quad (6)$$

Gas diffusion in CMS membrane is an activated process, which requires penetrants to have enough activation energy to overcome repulsion from size discriminating pores, so $D_A$ follows an Arrhenius relationship.

$$D_A = D_{0A} \exp\left(\frac{-E_{DA}}{RT}\right) \quad (7)$$

where R is the molar gas constant, T is the temperature, $D_{0A}$ and $E_{DA}$ are the pre-exponential factor and activation energy for diffusion of penetrant A, respectively.

The thermodynamically-based sorption coefficient $\mathbb{S}_A$ decreases with temperature, following van't Hoff equation.

$$\mathbb{S}_A = \mathbb{S}_{0A} \exp\left(\frac{-H_{SA}}{RT}\right) \quad (8)$$

where $\mathbb{S}_{0A}$ is the preexponential factor for sorption, and $H_{SA}$ is the apparent heat of sorption, which is typically negative. From Eqs. (3), (7) and (8), we get $$P_A = P_{0A} \exp\left(\frac{-E_{PA}}{RT}\right) \quad (9)$$

where $$P_{0A} = D_{0A} \cdot \mathbb{S}_{0A} \quad (10)$$

$$E_{PA} = E_{DA} + H_{SA} \quad (11)$$

Since the increase in diffusion coefficient typically exceeds the decrease in sorption coefficient with rising temperature, permeability usually increases with temperature.

As the rigid ultramicropore window size ($d_c$ in FIG. 3 (c)) approaches the minimum dimension of gas penetrants, very effective size and shape diffusion selection becomes possible, thereby providing high diffusion selectivity. Unlike polymer membranes, highly rigid size and shape media such as CMS materials can introduce an additional factor, termed 'entropic diffusion selectivity'. This factor can provide additional diffusion selectivity by differentiating the pre-exponential factor ($D_{0A}$) in favor of penetrants that do not give up degrees of freedom in the diffusion transition state. As will be discussed later, the linear nature of $N_2$ enables it to benefit from small slit-shaped pores typical of CMS. This simple feature will be shown to be useful in understanding the $N_2/CH_4$ selectivity of our CMS samples.

In order to achieve the described selectivity and permeability, the process for preparing the CMS membranes had to be developed that achieved the preferred structural aspects discussed above. In an embodiment, a process for forming a nitrogenmethane separation carbon membrane can include subjecting a polymer precursor membrane to a pyrolysis temperature of at least about 675° C. in an inert atmosphere, wherein the polymer precursor membrane is a polyimide as described above. In an embodiment, the pyrolysis temperature can be at least 700° C., at least about 750° C., or at least about 800° C. The polyimide can have a fraction of its carbon atoms that are $sp^2$ hybridized of at least about 70 atom %, at least about 75 atom %, or at least about 80 atom %. The polyimide can have a portion of atoms conjugated to an aromatic ring can be at least about 45 atom %, or at least about 50 atom %. Or, the polyimide can be at least about 60 wt % carbon and less than about 5 wt % hydrogen, at least about 65% weight carbon and less than about 5 wt % hydrogen, or at least about 70 wt % carbon and less than about 5 wt % hydrogen.

In an embodiment, the pyrolysis can be conducted in an inert atmosphere. In an embodiment, the pyrolysis can be conducted in an argon atmosphere, preferably an ultrahigh purity argon atmosphere.

In an embodiment, the polymer precursor can be a polyimide selected from formulas I, II, III, IV, or V, preferably formulas I, II, III, or IV, or preferably formulas III or IV. In an embodiment, the polymer precursors can be blends of two or more of formulas I, II, III, IV, or V, or copolymers of two or more of formulas I, II, III, IV, or V.

CMS dense films were successfully prepared from commercial polyimide Matrimid® 5218 for $N_2/CH_4$ separation. CMS films showed significant improvement in separation performance compared to the polymer precursor. It was found that $N_2$ permeability decreases and $N_2/CH_4$ permselectivity increases with the increase of pyrolysis temperature. Very attractive separation performance was observed for 800° C. CMS dense film. With $N_2$ permeability of 6.78 Barrers and $N_2/CH_4$ permselectivity of 7.69 in pure gas permeation and $N_2$ permeability of 5.17 Barrers and $N_2/CH_4$ permselectivity of 5.94 in mixed gas permeation test, the permeation performance of this sample exceeds the polymer upper bound line. This type of high-performing CMS material has also been shown processable for the hollow fiber morphology.

Upon further study of this 800° C. CMS dense film, it was found that the high permselectivity is solely contributed by diffusion selectivity. Temperature dependences of permeabilities, sorption coefficients and diffusion coefficients were studied for this high performing material. It was found that permeabilities and diffusion coefficients increase with temperature, following an Arrhenius relationship, and sorption coefficients decrease with temperature, following a van't Hoff relationship. Temperature dependences of sorption coefficients revealed that the heat of adsorption of $N_2$ is slightly more negative than that of $CH_4$. As a result, the diffusion jump requires higher activation energy for $N_2$ than $CH_4$. Though diffusion activation energy makes negative contribution to the $N_2/CH_4$ diffusion selectivity, diffusion activation entropy compensates this effect and highly enhances the diffusion selectivity and permselectivity. This entropic diffusion selection effect is achieved by a very tight 'slit-shaped' pore structure that can effectively distinguish the size and shape difference between $N_2$ and $CH_4$.

With the development of the new materials, several additional disclosures can be described in view of these nitrogen/methane CMS membranes. In an embodiment, the disclosure can include a method for decreasing the nitrogen content of a nitrogenmethane gas mixture, or for purifying a nitrogen-contaminated methane stream by removing nitrogen from the methane stream. The methods can include contacting nitrogenmethane gas mixture with a gas separation membrane, and separating two gas streams at the membrane. One of the separated gas streams would be higher in nitrogen content compared to the nitrogen/methane mixture, and the other separated gas stream would be higher in methane content compared to the nitrogen/methane mixture. In an embodiment of the methods, the gas separation membrane can have a nitrogenmethane selectivity of at least about 5.0 and a nitrogen permeability of at least about 3.0 Barrers. The nitrogenmethane selectivity can be at least about 5.5, at least about 6.0, at least about 6.5, or at least about 7.0. The nitrogen permeability can be at least 3.5 Barrers, at least about 3.9 Barrers, at least about 4.0 Barrers, at least about 5.0 Barrers, at least about 5.5 Barrers, or at least about 6.0 Barrers. In some embodiments, the nitrogen permeability can be at least about 3.5 Barrers and the nitrogenmethane selectivity at least about 6.0, the nitrogen permeability can be at least about 5 Barrers and the nitrogenmethane selectivity at least about 5.5, the nitrogen permeability can be at least about 6 Barrers and the nitrogenmethane selectivity at least about 7.0, or the nitrogen permeability can be at least about 6 Barrers and the nitrogenmethane selectivity at least about 7.5.

Figure 13:
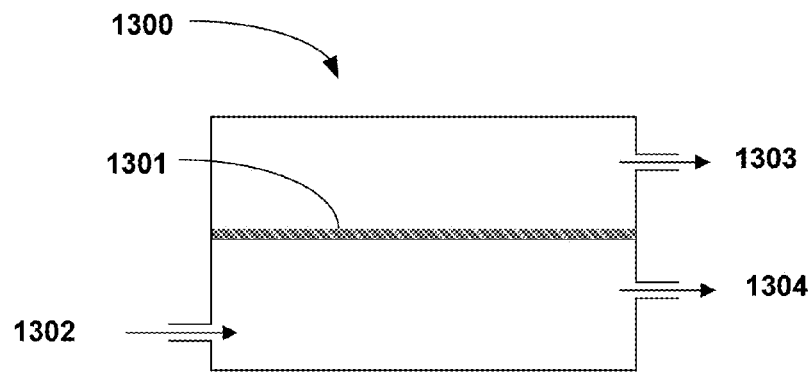
FIG. 13 illustrates a gas separation device in accordance with exemplary embodiments of the disclosure.

The CMS membrane of the disclosure can be used in devices to create a nitrogenmethane separation device, or a gas enrichment device. The membrane can be used in any device in which a CMS membrane could be applied. For example, the CMS membrane could be used as a membrane film 1301, as shown in FIG. 13. Gas separation device 1300 includes a nitrogenmethane mixture 1302, which enters into the device that is spanned by the CMS membrane film 1301. Nitrogen passes through the film 1301 to produce a nitrogen enriched stream 1303, and the remaining methane gas which is now depleted of nitrogen exits as a nitrogen depleted methane stream 1304. As one of ordinary skill in the art would appreciate, separation of the two gases across the membrane film 1301 can be tailored based on flows, pressure, and residence time to produce steams in the desired level of content. For example, the device could be operated in a manner such that stream 1304 is substantially all methane, and the nitrogen enriched stream 1303 includes some amount of methane. Alternatively, the nitrogen stream 1303 could be substantially all nitrogen, and some portion of the nitrogen can exit in the methane stream 1304. One of ordinary skill would also recognize that the exit streams 1303 or 1304 could be sent to a second separation device for further purification, and a set of films and devices could be set up in series.

Figure 14:
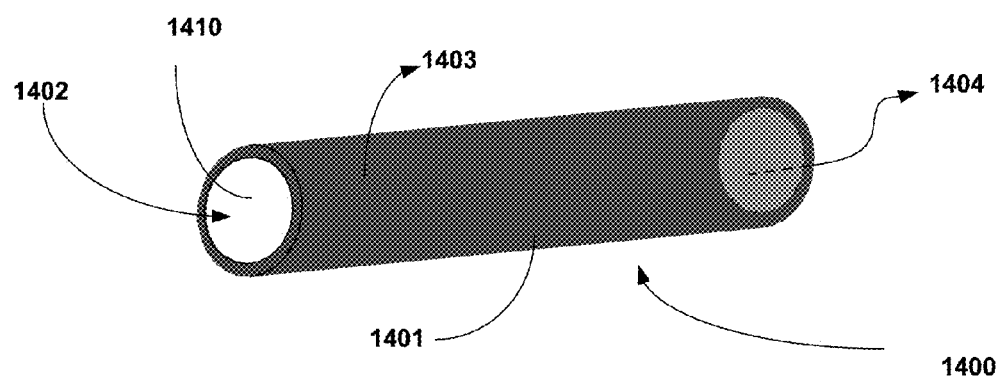
FIG. 14 illustrates a gas separation device in accordance with exemplary embodiments of the disclosure.

The CMS membrane can also be used as a hollow fiber membrane, as shown in FIG. 14. Hollow fiber membranes of this type have been demonstrated previously for gas separation applications, as shown in U.S. Patent Application Publication No. 2013/0152793, the contents of which are incorporated herein in their entirety. The hollow fiber membrane 1400 shown in FIG. 14 includes a CMS membrane 1401 and a lumen or bore, 1410, which passes through the length of the hollow fiber. The nitrogen methane mixture 1402 enters the bore or lumen and passes through the length of the hollow fiber. The CMS membrane allows nitrogen to exit through the wall of the hollow fiber to produce the nitrogen enriched stream 1403 while the remaining methane gas passes down the length to exit at the end as a nitrogen depleted methane stream 1404. The hollow fiber 1400 would be part of a separation device, such that none of the streams 1402, 1403, or 1404 would intermix. Multiple hollow fibers can be used in series as a bundle in the separation device.

Alternatively, the nitrogenmethane gas mixture could be passed across the outside of the hollow fiber, allowing nitrogen to pass across the CMS membrane and into the bore or lumen of the tube, and thereby separate the gas streams.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

EXAMPLES

Example 1

Several polyimide polymers as the precursors for CMS membranes have been studied in this work. They are BTDA-s/aMDA (structure I), BTDA-sMDA (structure II), Matrimid® (structure III), P84® (structure IV), Kapton® (structure V), 6FDA:BPDA(1:1)-DAM (structure VI), 6FDA-DAM (structure VI), and 6FDA-mPDA (structure VIII), where BTDA-sMDA has only symmetric MDA as the diamine and BTDA-s/aMDA has a 50:50 combination of symmetric and asymmetric MDA as the diamine. Polyimides are chosen here due to their outstanding properties such as high glass transition temperatures, good processability, good mechanical strength, high carbon yields, and low shrinkage. Kapton® is in a film morphology and other polyimide precursors are cast into dense film through either solution casting or melting pressing process, All the precursor dense films were pyrolyzed under ultra high purity (UHP) argon with temperature gradually increased to 800° C. and soaked at this final temperature for 2 hr. The high pyrolysis temperature (above 675° C.) is critical to achieve high $N_2$ /$CH_4$ selectivity. Higher pyrolysis temperature usually leads to lower permeability and higher selectivity of CMS membranes, because graphene-like sheets begin to align parallel on a short range and pack more closely to each other as temperature increases. The difference of kinetic diameters of $N_2$ and $CH_4$ is very small (3.64 Å vs. 3.80 Å). Thus increasing pyrolysis temperatures helps to decrease the size of ultramicropores to approach the sizes of gas molecules and highly improve the molecular sieving effect. Apart from the small size difference, the counter effect of sorption competition is another challenge for the membrane separation of $N_2$ /$CH_4$. The sorption coefficient of $CH_4$ is much higher than that of $N_2$ due to the higher condensability of $CH_4$. Thus the diffusion selectivity has to be high enough to overcome the low sorption selectivity to achieve a satisfying overall permselectivity.

The structures of the precursors that have been studied in this work are shown in FIG. 1. The separation performance of resulting CMS membranes is shown in Table 1 and FIG. 2.

TABLE 1

Separation Performance of CMS membranes (pyrolyzed at 800° C. and soaked for 2 hr under UHP argon)

| Precursor | $N_2$ Permeability (Barrers) | $CH_4$ Permeability (Barrers) | $N_2$/$CH_4$ Permselectivity |
|---|---|---|---|
| BTDA-s/aMDA | 3.9 | 0.64 | 6.0 |
| BTDA-sMDA | 5.6 | 1.0 | 5.6 |
| Matrimid ® | 6.8 | 0.88 | 7.7 |
| P84 ® | 6.4 | 0.81 | 7.9 |
| Kapton ® | 0.92 | 0.14 | 6.6 |
| 6FDA:BPDA(1:1)-DAM | 25 | 17 | 1.5 |
| 6FDA-DAM | 32 | 19 | 1.7 |
| 6FDA-mPDA | 26 | 20 | 1.3 |

CMS membranes derived from BTDA-s/aMDA, BTDA-sMDA, Matrimid®, P84®, and Kapton® showed separation performance beyond the upper bound line of polymer membranes, with first four providing more attractive $N_2$ /$CH_4$ separation capability.

6FDA:BPDA(1:1)-DAM, 6FDA-DAM and 6FDA-mPDA have bulky $CF_3$ groups in polymer chains, which lead to more open ultramicropore structures and higher volume of sorptive micropores compared to the other precursors. CMS membranes derived from 6FDA:BPDA(1:1)-DAM and 6FDA-DAM have previously shown attractive separation performance with good selectivities and very high permeabilities for several gas pairs like $CO_2$ /$CH_4$, $O_2N_2$, ethyleneethane and propylenepropane. However, $N_2$ /$CH_4$ separation performance of CMS membranes derived from these 6FDA-based precursors is not attractive—though $N_2$ permeabilities are much higher than the other studied CMS membranes, $N_2$ /$CH_4$ selectivities are very low. The reason behind the difference of separation performance is that although the molecular sieving effect on ultramicropores is strong enough for the other gas pairs, it is still weak for $N_2$ /$CH_4$ due to the small molecular size difference and competing effect between diffusion and sorption for $N_2$ /$CH_4$. Tighter ultramicropore structure and stronger molecular sieving effect are required for $N_2$ /$CH_4$ separation.

Example 2

Commercially available polyimide Matrimid® 5218 obtained from Huntsman International LLC was first dried in oven at 110° C. overnight, and then dissolved in dichloromethane (≥99.8% purity, Sigma-Aldrich) to form a 2-5 wt % polymer dope. This dope was placed on a roller for at least 6 h for mixing before solution casting. Then the polymer dope was cast in Teflon dish in a dichloromethane saturated glove bag, and left for 3 days at room temperature to achieve slow evaporation of the solvent. The vitrified film was then removed and dried in a vacuum oven at 120° C. for at least 12 h to remove residual solvent. The dried film was cut into small discs with a one inch die for pyrolysis. All films had a thickness of 70±15 μm for consistency.

Figure 4:
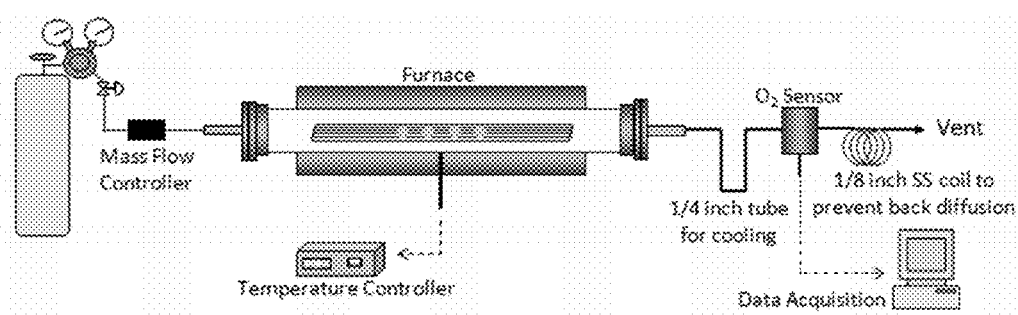
FIG. 4 illustrates a schematic of a pyrolysis system, in accordance with exemplary embodiments of the disclosure.

The polymer film discs were placed on a corrugated quartz plate (United Silica Products, Franklin, N.J.) in a quartz tube (National Scientific Company, GE Type 214 quartz tubing, Quakertown, Pa.), and then loaded into a pyrolysis furnace (Thermocraft, Inc., model 23-24-1ZH, Winston-Salem, N.C.). This pyrolysis setup was updated from a previously reported apparatus, as shown in FIG. 4. The updates include: 1) a new mass flow controller (Alicat Scientific, Inc., Tucson, Ariz.), 2) a U-shaped ¼ inch stainless steel tube at the downstream side of the quartz tube to cool flowing gas below the maximum working temperature of the $O_2$ sensor (650° C.), and 3) a ⅛ inch stainless steel tube coil in the purge line to prevent any back diffusion to the pyrolysis system.

After purging the tube with UHP argon for at least 12 hours to ensure the monitored oxygen level was lowered down below 1 ppm, Matrimid® dense films were pyrolyzed under 200 sccmin argon purge to avoid external mass transfer complications. The following previously optimized heating protocol was used to reach a final temperature of 550, 675, or 800° C.

(1) 50→250° C. at a ramp rate of 13.3° C./min.
(2) 250° C.→($T_{max}$–15)° C. at a ramp rate of 3.85° C./min.
(3) ($T_{max}$–15)° C.→$T_{max}$° C. at a ramp rate of 0.25° C./min.
(4) Soak at $T_{max}$ for 2 h.

After the heating protocol was complete, the furnace was allowed to cool naturally under the UHP argon flow. All samples were loaded into permeation or sorption system within 24 h for consistency. After each pyrolysis run, both the quartz tube and the quartz plate were thoroughly rinsed with acetone and baked under 500 scc/min UHP air flow at 800° C. for 2 h to remove any deposit that could affect subsequent runs. Replicates with the same pyrolysis conditions were done and small deviation was observed.

Precursor and CMS dense films were masked with impermeable aluminum tape and Duralco 4525 epoxy, and loaded into a constant-volume permeation system. Pure gas $N_2$ and $CH_4$ permeation tests were performed at 25, 35, and 50° C. under 65 psia upstream pressure following the procedures described before. Mixed gas permeation with a 20% $N_2$,80% $CH_4$ feed under 100 psia total feed pressure was performed at 35° C. for the 800° C. CMS film. The downstream pressure rise was recorded over time using LabVIEW (National Instruments, Austin, Tex.) until at least 6 times of time lag were reached. The downstream composition was determined using a gas chromatograph (Bruker 450-GC) during mixed gas permeation experiments. Film thickness was measured with a micrometer (Mitutoyo Series 293) and testing area was measured by a scanner (Epson V500).

The sorption coefficients of CMS samples were measured by a pressure decay sorption system at 25, 35 and 50° C. The CMS samples were loaded into a porous stainless steel filter holder (0.5 µm, Swagelok) and wrapped with aluminum foil and a piece of copper wire to secure the CMS sample inside the holder. The wrapped filter was degassed in a vacuum oven at 180° C. overnight to obtain accurate weight of the CMS sample and then loaded into sorption system. The same procedures were followed as previously described to obtain pressure decay sorption data. The density and volume of the CMS samples were measured by a 25 ml pycnometer (KIMAX) with ethanol (≥99.8% purity, Sigma-Aldrich) as the liquid with known density. A mole balance was used to calculate the amount of gas taken up by the CMS sample. Gas uptake was plotted against pressure and the data was fitted to Langmuir model to obtain sorption isotherms.

Figure 5:
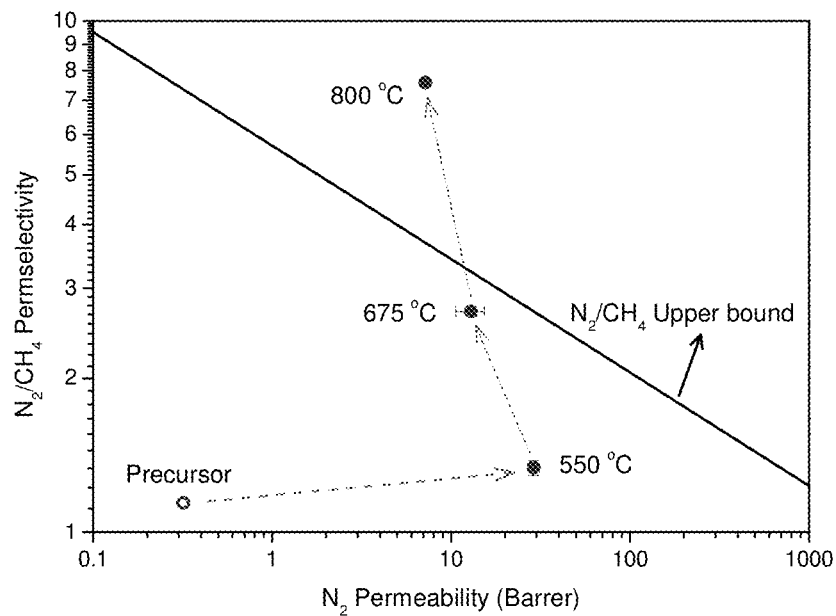
FIG. 5 illustrates $N_2$ permeability and $N_2$/$CH_4$ permselectivity of Matrimid® precursor and CMS dense films pyrolyzed at 550, 675, and 800° C. Each CMS data points represent an average of two CMS films with the error bars shown (the error bars for 800° C. CMS are too small to be seen) in accordance with exemplary embodiments of the disclosure.

Matrimid® dense films were pyrolyzed under UHP argon at three final pyrolysis temperatures of 550, 675, and 800° C., following the temperature protocol listed above. Pure nitrogen and methane permeation tests were performed at 35° C. and 65 psia feed pressure for both Matrimid® precursor and the resulting CMS dense films for consistency. The 65 psia feed pressure was chosen to avoid the complication with seals for the somewhat brittle carbon films to ensure the ability to probe the full temperature range in permeation test. The fragility is usually not an issue for CMS hollow fibers, which will be the next step in our research. Since the best performance was seen for 800° C. pyrolysis, samples made under this condition were studied in most detail. Specifically, sorption tests at 35° C. were performed on the 800° C. pyrolyzed CMS dense films. The $N_2$ permeability and $N_2/CH_4$ permselectivity are plotted on the so-called $N_2/CH_4$ upper bound in FIG. 5. $N_2$ permeability and $N_2/CH_4$ permselectivity of Matrimid® precursor and CMS dense films pyrolyzed at 550, 675, and 800° C. Each CMS data points represent an average of two CMS films with the error bars shown (the error bars for 800° C. CMS are too small to be seen). Robeson's $N_2/CH_4$ upper bound line is shown for reference. As seen from FIG. 5, all CMS films performed much better than the polymer precursor, providing higher $N_2$ permeability and $N_2/CH_4$ permselectivity at the same time. The $N_2$ permeability, sorption coefficient, diffusion coefficient and corresponding $N_2/CH_4$ selectivities of Matrimid® precursor and 800° C. pyrolyzed CMS dense film are listed in Table 2. From these data, it can be concluded that the improvement of $N_2$ permeability after pyrolysis mainly results from the increase of $N_2$ sorption coefficients, more specifically, the increase of Langmuir hole-filling capacity $C'_{H,N_2}$. On the other hand, the enhancement of $N_2/CH_4$ permselectivity mainly results from the increase of diffusion selectivity. This conclusion is consistent with the unique structure of CMS membranes,—micropores provide high sorption coefficients and high permeability, while ultramicropores function as molecular sieving sites to give high diffusion selectivity and permselectivity.

TABLE 2

Permeabilities, sorption and diffusion coefficients of Matrimid® polymer dense film and 800° C. pyrolyzed CMS dense film

| Membrane | Matrimid® | CMS_800° C. |
|---|---|---|
| $P_{N_2}$ (Barrer) | 0.32 | 6.78 |
| $D_{N_2}$ ($10^{-8}$ cm²/s) | 0.662 | 0.619 |
| $S_{N_2}$ (cm³ (STP)/cm³ CMS/psi) | 0.025 | 0.566 |
| $C'_{H, N_2}$ (cm³ (STP)/cm³ CMS) | 3.94 | 81.34 |
| $b_{N_2}$ (1/psi) | 0.006 | 0.013 |
| $k_{D, N_2}$ (cm³ (STP)/cm³ CMS/psi) | 0.008 | — |
| $P_{N_2}/P_{CH_4}$ | 1.14 | 7.69 |
| $S_{N_2}/S_{CH_4}$ | 0.37 | 0.50 |
| $D_{N_2}/D_{CH_4}$ | 3.05 | 15.3 |

Sorption isotherm parameters were measured at 35° C. Permeabilities, sorption coefficients, diffusion coefficients, and selectivities are based on 35° C., 65 psia. The sorption coefficients of Matrimid® precursor were obtained from literature.

Figure 6:
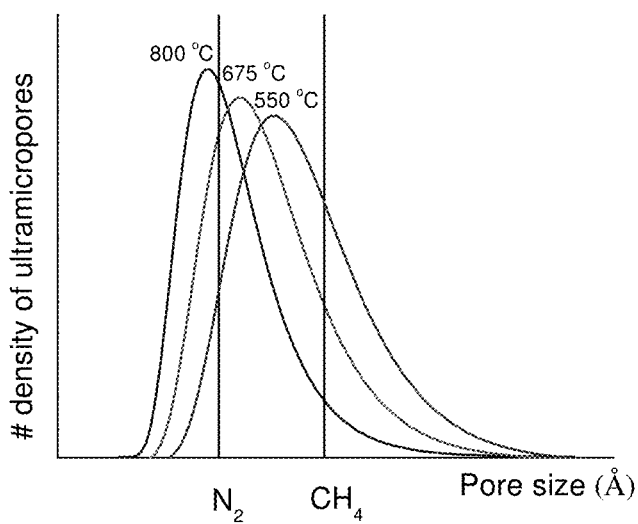
FIG. 6 illustrates idealized hypothetical ultramicropore size distribution for CMS membranes pyrolyzed at three final pyrolysis temperatures, in accordance with embodiments of the disclosure.

It is also observed that as pyrolysis temperature increases, permeability decreases while $N_2/CH_4$ permselectivity increases. This can be qualitatively explained by the hypothetical ultramicropore size distribution curve (FIG. 6) proposed by Steel and Koros. A given gas penetrant has free diffusive access to all inter-connected pores that are longer than its characteristic size. In FIG. 6, the number of these accessible pores is represented as the area under the distribution curve and to the right of the line of this penetrant. The area ratio of two gas penetrants represents the diffusion selectivity. As final pyrolysis temperature increases, CMS structure starts to be more tightly packed, resulting in the ultramicropore distribution shifting to the lower size end. As a result, the diffusion coefficient and permeability of both penetrants decrease, but $N_2/CH_4$ diffusion selectivity and permselectivity increase since the loss in pore access is relatively less for the 'slimmer' $N_2$ vs. $CH_4$.

The 800° C. CMS membrane provides an attractive combination of $N_2$ permeability and $N_2/CH_4$ permselectivity that exceeds the polymer-based upper bound line. According to Table 2, the high $N_2/CH_4$ permselectivity is solely contributed by a high diffusion selectivity of 15.1, while the sorption selectivity of 0.51 gives negative contribution to the permselectivity. It should be noticed that such a high pyrolysis temperature is essential to effectively separate $N_2$ and $CH_4$. For other less demanding gas pairs like $O_2/N_2$, $CO_2/CH_4$, $C_2H_4/C_2H_6$, and $C_3H_6/C_3H_8$, lower pyrolysis temperatures of 675° C. and 550° C. are adequate; however, the lower final pyrolysis temperatures give poor separation performance for $N_2/CH_4$. The tradeoff between diffusion selectivity from the relatively small size difference of $N_2$ and $CH_4$ (kinetic diameter 3.64 vs. 3.80 Å) and the $N_2$ permeability does not become attractive until the ultramicropores are tightened at the high pyrolysis temperature.

The 800° C. CMS membrane was also tested for mixed gas permeation with a 20% $N_2$/80% $CH_4$ feed under 100 psia total pressure at 35° C. The mixed gas permeation data are provided in supplementary material to avoid complicating the following discussion based on intrinsic properties of the penetrants.

Figure 7:
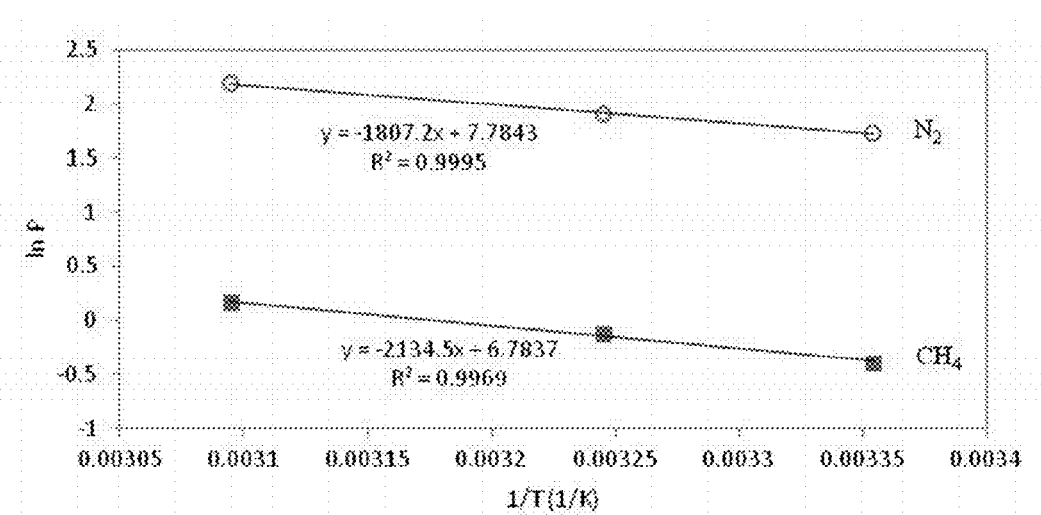
FIG. 7 illustrates temperature dependence of permeabilities of 800° C. CMS membrane at 65 psia (permeability P is in the unit of Barrer) in accordance with exemplary embodiments of the disclosure.

Since the 800° C. CMS sample was most attractive, its temperature dependence of permeabilities and permselectivity were studied further over the permeation test range of 25-50° C. at 65 psia upstream pressure. Permeabilities, permselectivities and Arrhenius parameters in Eq. (9) for the temperature range between 25-50° C. are reported in Table 3, with the least squares fitting plot shown in FIG. 7. The error analysis was done following previously described method. Results show that the permeabilities of both $N_2$ and $CH_4$ increase with permeation temperature; however, the larger $CH_4$ penetrant shows stronger temperature dependency with higher permeation activation energy, so $N_2/CH_4$ permselectivity decreases with temperature.

TABLE 3

Permeation properties of 800° C. CMS membrane at 65 psia

| | | $N_2$ | $CH_4$ |
|---|---|---|---|
| P (Barrer) | 25° C. | 5.62 | 0.68 |
| | 35° C. | 6.78 | 0.88 |
| | 50° C. | 8.98 | 1.19 |
| $E_P$ (kJ/mol) | | 15.0 ± 0.3 | 17.7 ± 1.0 |
| $P_0$ (Barrer) | | (2.40 ± 0.31) × 10$^3$ | (8.83 ± 3.40) × 10$^2$ |
| $P_{N_2}/P_{CH_4}$ | 25° C. | | 8.27 |
| | 35° C. | | 7.69 |
| | 50° C. | | 7.57 |

Figure 8:
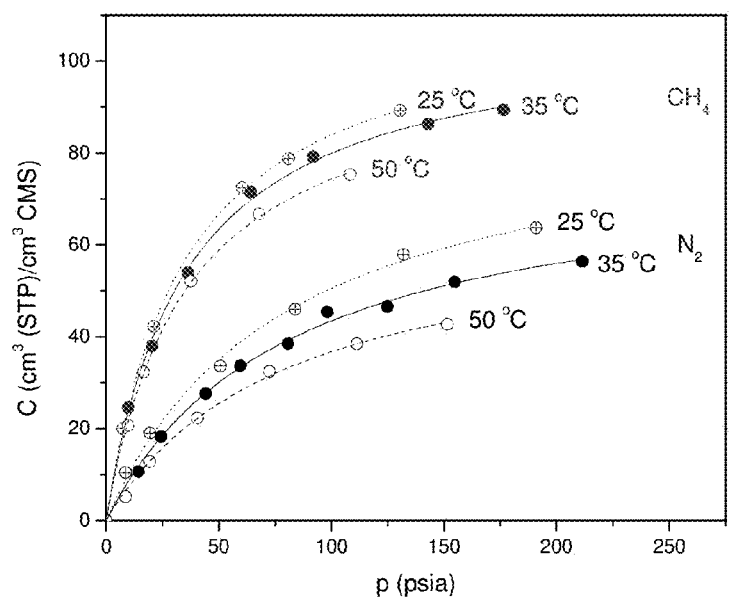
FIG. 8 illustrates $N_2$ and $CH_4$ Langmuir isotherms of 800° C. CMS dense film at 25, 35 and 50° C. in accordance with exemplary embodiments of the disclosure.

The temperature dependence of sorption coefficients of 800° C. CMS dense film was investigated between 25 and 50° C., and $N_2$ and $CH_4$ sorption isotherms in this temperature range are shown in FIG. 8. The values of Langmuir isotherm parameters fitted from Eq. (4) are listed in Table 4. As expected, $CH_4$ shows higher hole-filling capacity $C'_H$ and higher affinity constant b than $N_2$ due to its higher condensability compared to $N_2$, reflected by the relative critical temperatures ($N_2$ 126 K vs. $CH_4$ 191 K). The Langmuir affinity constants b of both $N_2$ and $CH_4$ show little temperature dependence, but the Langmuir hole-filling capacity $C'_H$ decreases with increasing temperature for both $N_2$ and $CH_4$. The rigid structure of CMS membrane makes it unlikely that the micropore volume will substantially change over the temperature range investigated. Nevertheless, since densities of sorbed penetrants at saturation in microporous cavities decrease with increasing temperature, most of the change in $C'_H$ presumably reflects the change of sorbed density at saturation in the CMS membrane.

Figure 9:
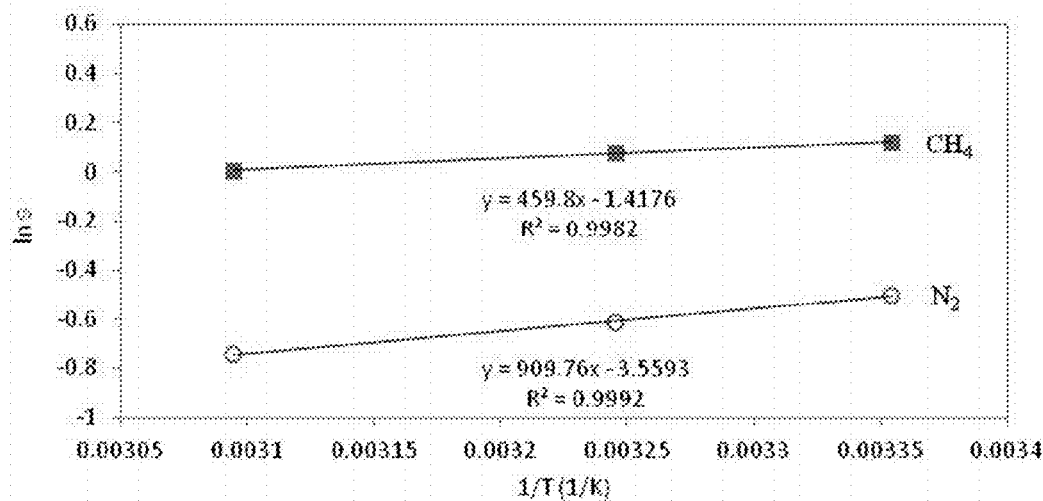
FIG. 9 illustrates temperature dependence of sorption coefficients of a 800° C. CMS membrane at 65 psia (sorption coefficient $S$ is in the unit of $cm^3$ (STP)/$cm^3$ CMS/psi) in accordance with exemplary embodiments of the disclosure.

The temperature dependence of sorption coefficients follows the van't Hoff relationship described by Eq. (8), and the sorption properties of 800° C. CMS dense film at 25, 35, and 50° C. and 65 psia are listed in Table 5. The apparent heat of sorption $H_S$ and sorption pre-exponential factor $\mathcal{S}_0$ for $N_2$ and $CH_4$ are obtained from least squares fitting of Eq. (8) (FIG. 9) and listed in Table 5. FIG. 9. shows temperature dependence of sorption coefficients of 800° C. CMS membrane at 65 psia (sorption coefficient $\mathcal{S}$ is in the unit of cm$^3$ (STP)/cm$^3$ CMS/psi) Results show that the sorption coefficients of $N_2$ and $CH_4$, and $N_2/CH_4$ sorption selectivity all decrease with increasing temperature. It should be noticed that $N_2$ shows lower (more negative) apparent heat of adsorption than $CH_4$. In the exothermic sorption process, more negative heat of adsorption indicates lower adsorbed energy. This is contrary to the general trend that more condensable penetrants with higher critical temperature exhibit more negative heats of sorption that Costello and Koros previously proved in some polyimides and polycarbonates. However, in some other polymers, zeolite and active carbon, more negative heats of sorption of $N_2$ than $CH_4$ have also been observed. The lower adsorbed energy of $N_2$ in CMS might be explained by the interaction between the quadrupole moments of $N_2$ molecule and graphite basal plane.

TABLE 4

Langmuir isotherm parameters of 800° C. CMS dense film at 25, 35 and 50° C.

| Gas | | $C'_H$ (cm$^3$ (STP)/cm$^3$ CMS) | b (1/psia) |
|---|---|---|---|
| $N_2$ | 25° C. | 102.1 ± 4.4 | 0.014 ± 0.002 |
| | 35° C. | 77.9 ± 2.5 | 0.013 ± 0.003 |
| | 50° C. | 59.5 ± 1.1 | 0.014 ± 0.001 |
| $CH_4$ | 25° C. | 115.2 ± 5.5 | 0.027 ± 0.004 |
| | 35° C. | 108.1 ± 3.4 | 0.028 ± 0.003 |
| | 50° C. | 98.5 ± 0.9 | 0.030 ± 0.001 |

TABLE 5

Sorption properties of 800° C. CMS membrane at 65 psia

| | | $N_2$ | $CH_4$ |
|---|---|---|---|
| S (cm$^3$ (STP)/cm$^3$ CMS/psi) | 25° C. | 0.603 | 1.131 |
| | 35° C. | 0.543 | 1.080 |
| | 50° C. | 0.476 | 1.004 |
| $H_S$ (kJ/mol) | | −7.6 ± 0.2 | −3.8 ± 0.2 |
| $S_0$ (cm$^3$ (STP)/cm$^3$ CMS/psi) | | 0.028 ± 0.002 | 0.242 ± 0.015 |
| $S_{N_2}/S_{CH_4}$ | 25° C. | | 0.53 |
| | 35° C. | | 0.50 |
| | 50° C. | | 0.47 |

Figure 10:
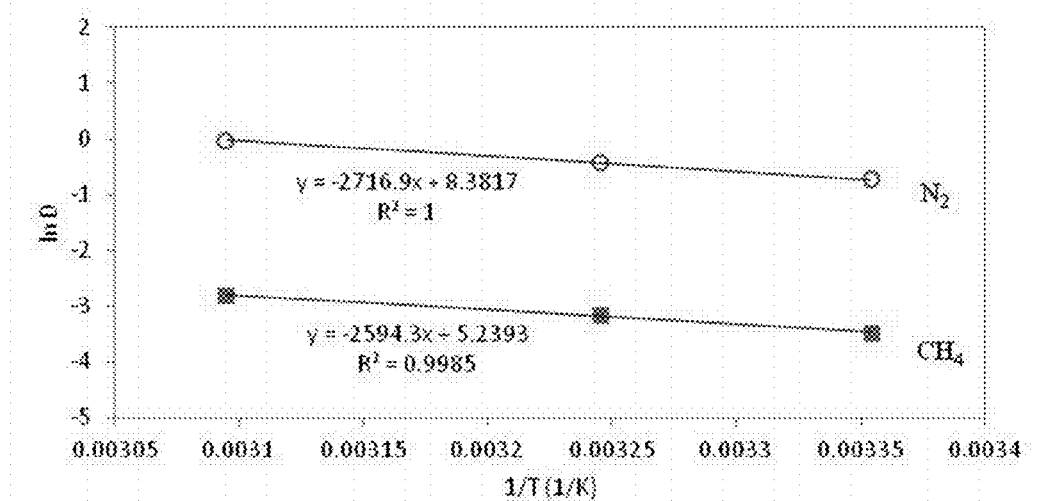
FIG. 10 illustrates temperature dependence of diffusion coefficients of a 800° C. CMS membrane at 65 psia (diffusion coefficient D is in the unit of $10^{-8}$ $cm^2/s$) in accordance with exemplary embodiments of the disclosure.
Figure 11:
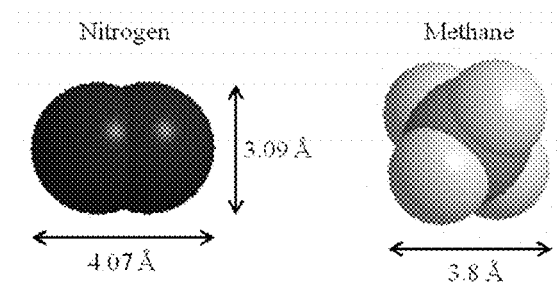
FIG. 11 illustrates sizes and shapes of $N_2$ and $CH_4$ molecule in accordance with exemplary embodiments of the disclosure.

From the permeabilities and sorption coefficients measured at 25, 35, and 50° C., diffusion coefficients were obtained at these temperatures using Eq. (3) and are listed with diffusion selectivities in Table 6. The temperature dependence of diffusion coefficients follow the Arrhenius relationship described by Eq. (7). The activation energy of diffusion $E_D$ and diffusion pre-exponential factor $D_0$ for $N_2$ and $CH_4$ were obtained from least squares fitting of Eq. (7) (FIG. 10) and are listed in Table 6. As expected, the diffusion coefficients of both $N_2$ and $CH_4$ increase with temperature; however, since the temperature dependences of these two diffusion coefficients are at a similar level, the diffusion selectivity trend is not significant beyond experimental error. The higher diffusion activation energy for $N_2$ vs. $CH_4$ is interesting, given the relative size of $N_2$ and $CH_4$. According to the Kihara potential, the length and width of spherocylindrical $N_2$ are considered to be 3.09 and 4.07 Å, respectively, while $CH_4$ can be considered essentially a spherical molecule with kinetic diameter of 3.8 Å (FIG. 11). The diffusion jump between a normal state and an activated state in the molecular sieving ultramicropore window effectively determines the diffusion selectivity. The normal state can be either a free molecule within the micropores, or an adsorbed state on the graphitic basal plane in the micropores. From either of the states, the penetrant must acquire adequate energy to overcome the repulsion opposing movement into the ultramicropore. The slimmer shape of $N_2$ would seem to experience less repulsion than that of $CH_4$; however, if the penetrant starts its diffusion jump from a lower energy adsorbed state, more energy is required to desorb from the sorption site before it can jump into the ultramicropore. Thus the diffusion activation energy $E_D$, will be the sum of the desorption energy $E_{desorb}$, and the energy to overcome ultramicropore repulsion, $E_{repulsion}$, as shown below.

$$E_D = E_{desorb} + E_{repulsion} \quad (12)$$

Indeed, the apparent heat of sorption shows a roughly 3.8 kJmol stronger interaction between $N_2$ and the sorption site, and the $N_2$ activation energy to jump from an adsorbed state to ultramicropore is 1 kJmol higher than that of $CH_4$. This difference is only slightly beyond the experimental uncertainty and may not be significant; however, studies over larger temperature ranges might be useful to explore this issue in more detail. In any case, it appears possible that a lower repulsion of the compact $N_2$, coupled with a lower sorbed energy for $N_2$ vs. $CH_4$ combine to yield the similar diffusion activation energies observed for the quite different sized penetrants. If the ultramicropores were smaller, due to more extensive thermal exposure during pyrolysis, $CH_4$ may be able to barely get through, while the slimmer $N_2$ could pass. In such a hypothetical case, the repulsion opposing the diffusion jump of $CH_4$ is expected to increase much more significantly than that of $N_2$, and the lower repulsion for $N_2$ might compensate its higher energy of desorption. In such a case, one might expect to observe an overall lower diffusion activation energy for $N_2$ relative to $CH_4$; however, both activation energies would be higher than observed here. This means if subtly tighter ultramicropores can be achieved, the energetic factor in diffusion selectivity could assist $N_2$, in addition to an entropic factor, discussed below.

TABLE 6

Diffusion properties of 800° C. CMS membrane at 65 psia

|  |  | $N_2$ | $CH_4$ |
|---|---|---|---|
| $D$ ($10^{-8}$ cm$^2$/s) | 25° C. | 0.482 | 0.031 |
|  | 35° C. | 0.646 | 0.042 |
|  | 50° C. | 0.975 | 0.061 |
| $E_D$ (kJ/mol) |  | 22.6 ± 0.1 | 21.6 ± 0.8 |
| $D_0$ ($10^{-8}$ cm$^2$/s) |  | (4.37 ± 0.20) × $10^3$ | (1.89 ± 0.61) × $10^2$ |
| $D_{N_2}/D_{CH_4}$ | 25° C. | 15.5 | |
|  | 35° C. | 15.3 | |
|  | 50° C. | 16.0 | |
| Entropic factor in Eq. (14) |  | 23.6 | |
| Energetic factor in Eq. (14) |  | ~0.7 | |

The energetic factor is calculated at 35° C.

Diffusion selectivity can be further decomposed into a product of entropic selectivity and energetic selectivity according to Eq. (7). The pre-exponential factor $D_0$ can be represented from transition state theory as $$D_0 = e\lambda^2 \frac{kT}{h} \exp\left[\frac{S_D}{R}\right] \quad (13)$$

where $\lambda$ is the average diffusive jump length, $S_D$ is the activation entropy of diffusion, k is Boltzmann's constant, and h is Planck's constants [45]. Note that the S used for entropy here is different from the $\mathcal{S}$ used for the sorption coefficient. For gas pairs with similar kinetic diameters able to access all of the micropores, $\lambda$ can be considered equal for both gases. According to Eq. (7) and (13), the diffusion selectivity for a gas pair can be decomposed to the product of an entropic factor and an energetic factor, as shown below.

$$\frac{D_A}{D_B} = \frac{D_{0A}}{D_{0B}} \exp\left(-\frac{E_{DA} - E_{DB}}{RT}\right) \quad (14)$$

$$= \underbrace{\exp\left(\frac{S_{DA} - S_{DB}}{R}\right)}_{\text{Entropic selectivity}} \cdot \underbrace{\exp\left(-\frac{E_{DA} - E_{DB}}{RT}\right)}_{\text{Entropic selectivity}}$$

$$= \exp\left(\frac{\Delta S_{DA,B}}{R}\right) \cdot \exp\left(-\frac{\Delta E_{DA,B}}{RT}\right)$$

where $\Delta S_{DA,B}$ is the difference in the diffusion activation entropy for penetrants A and B, and $\Delta E_{DA,B}$ is the difference in the activation energy of diffusion for penetrants A and B. The entropic factor and energetic factor in the $N_2$/$CH_4$ diffusion selectivity of the 800° C. CMS membrane are listed in Table 6. These results show that energetic factor makes negative contribution to the diffusion selectivity due to the higher apparent diffusion activation energy for $N_2$; however, the entropic factor provides a significant contribution to the high diffusion selectivity.

High entropic diffusion selectivity has been previously observed in molecular sieving materials including zeolite 4A and CMS for $O_2N_2$ and $C_2H_4C_2H_6$; however, an entropic contribution to $N_2$/$CH_4$ diffusion selectivity in molecular sieving materials has not been reported previously. The highest $N_2$/$CH_4$ entropic diffusion selectivity that has been observed in polymer is 3.5, which was obtained from 6FDAPMDA(5050)-TAB membrane.

The high entropic factor in $N_2$/$CH_4$ diffusion coefficient can be interpreted using the Transition State Theory. According to this theory, the diffusion coefficient for a penetrant through any medium can be described by the following equation $$D = \lambda^2 \frac{kT}{h} \frac{F^{\neq}}{F} \exp\left(\frac{-E_D}{RT}\right) \quad (15)$$

where $F^{\neq}$ represents the partition function for the gas penetrant in the transition state as it passes through the constricted ultramicropore window, and F is the partition function for the same molecule in the normal state when it resides in the micropore cavities.

Combining Eq. (7), (13) and (15), the $N_2$/$CH_4$ entropic diffusion selectivity can be written as $$\left(\frac{D_{N_2}}{D_{CH_4}}\right)_{entropic} = \exp\left(\frac{S_{D,N_2} - S_{D,CH_4}}{R}\right) = \frac{(F^{\neq}/F)_{N_2}}{(F^{\neq}/F)_{CH_4}} \quad (16)$$

The partition function consists of translational, rotational, and vibrational contributions, as shown below.

$$F = F_{trans} \cdot F_{rot} \cdot F_{vib} \quad (17)$$

These partition functions can be calculated in an idealized cubic cavity of dimension a using the following equations.

$$\text{Translational: } F_{trans} = \left(\frac{2\pi mkT}{h^2}\right)^{n/2} a^3 \quad (18)$$

Rotational: (19)

$$\text{Diatomic: } F_{rot} = \left(\frac{T}{\sigma \Theta_r}\right)^{n/2}$$

$$\text{Polyatomic: } F_{rot} = \frac{\pi^{n/6}}{\sigma^{n/3}}\left(\frac{T^3}{\Theta_{rA}\Theta_{rB}\Theta_{rC}}\right)^{n/6} \quad (20)$$

-continued

Vibrational:

Diatomic $F_{vib} = \left[\dfrac{\exp\left(-\dfrac{\Theta_v}{2T}\right)}{1-\exp\left(-\dfrac{\Theta_v}{T}\right)}\right]$ (21)

Polyatomic $F_{vib} = \displaystyle\prod_{i=1}^{n}\left[\dfrac{\exp\left(-\dfrac{\Theta_{v,i}}{2T}\right)}{1-\exp\left(-\dfrac{\Theta_{v,i}}{T}\right)}\right]$ (22)

where n is the number of degrees of freedom for each type of motion of the molecule, m is the mass of the molecule, k is Boltzmann constant, h is Planck constant. Besides, a is the length of the cubic cavity in which the penetrant is confined, $\Theta_r$, $\Theta_{r,A}$, $\Theta_{r,B}$, and $\Theta_{r,C}$ are the characteristic rotational temperatures, a is the symmetry number of the molecule, and $\Theta_v$ is the characteristic vibrational temperature. The characteristic rotational and vibrational temperatures $\Theta_r$ and $\Theta_v$ are used to simplify the partition function, and are defined as below $$\Theta_r = \dfrac{h^2}{8\pi^2 Ik} \quad (23)$$

$$\Theta_v = \dfrac{hv}{k} \quad (24)$$

where I is the moment of inertia, and v is the frequency of vibration. Parameters used in this calculation are listed in Table 7.

TABLE 7

Parameters used in entropic diffusion selectivity calculation

| | $N_2$ | $CH_4$ |
|---|---|---|
| $\Theta_r$ (K) | 2.88 | 7.54, 7.54, 7.54 |
| $\Theta_v$ (K) | 3374 | 4170, 2180(2), 4320(3), 1870(3) |
| σ | 2 | 12 |

The numbers in parentheses represent the degeneracy of each vibrational temperature.

Figure 12:
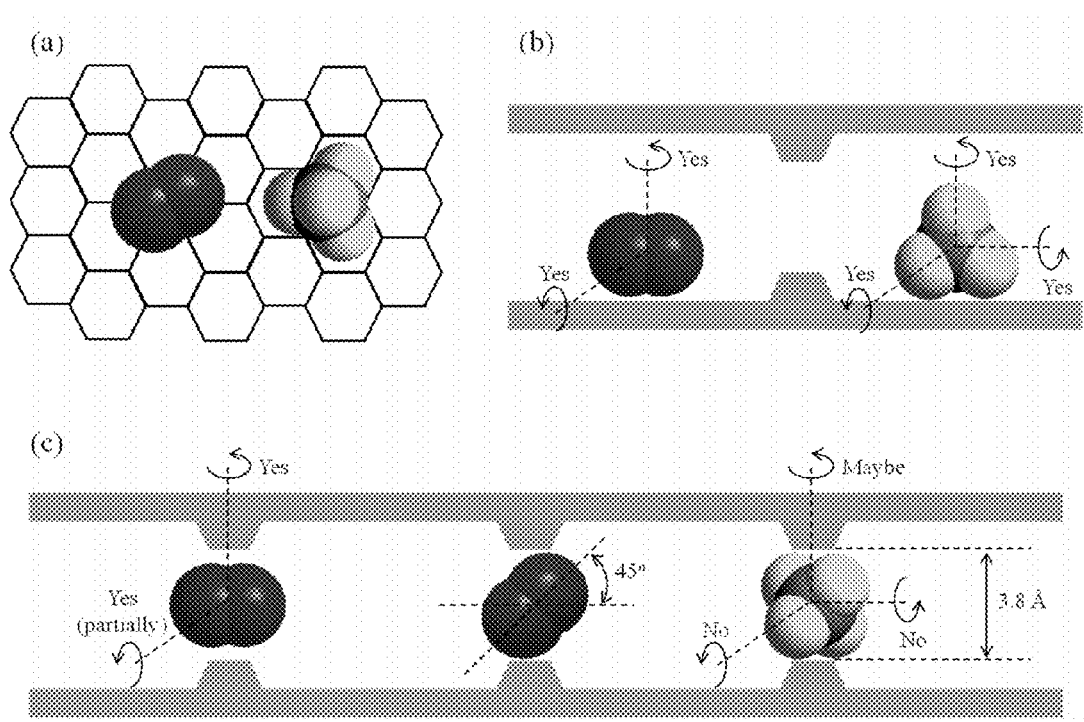
FIG. 12(a)-(d) illustrate configurations of $N_2$ and $CH_4$ in the normal and activated state, (a) top view of $N_2$ and $CH_4$ in adsorbed normal state, (b) side view of $N_2$ and $CH_4$ in adsorbed normal state, (c) side view of $N_2$ and $CH_4$ in activated transition state during a diffusion jump, in accordance with exemplary embodiments of the disclosure.

At this point, some speculative approximations must be made to proceed further. As noted above, gas penetrants initiate a diffusion jump from an adsorbed state, and we will idealize this state to be essentially adsorbed on the graphitic basal plane in the micropore, which is a reasonable limiting case. The activated transition state corresponds to that with the gas penetrant moving through the 'slit'-shaped ultramicropore of CMS with a characteristic average pore size shown as 3.8 Å. The normal state and activated state are illustrated in FIG. 12 for this case, and in the adsorbed normal state, both $N_2$ and $CH_4$ have an in-plane minimum energy adsorption orientation on the graphitic structure basal plane as shown in FIGS. 12 (a) and (b). However, at the temperatures investigated in this study, both penetrants in the adsorbed phase are orientationally disordered and can both translate and rotate. In the activated state, the partition function $F^*$ does not contain the translational partition function in the direction of gas diffusion (horizontal direction in FIG. 12(c)) for either penetrant, since the factor $$\dfrac{kT}{h}$$

in Eq. (15) accounts for this degree of freedom. The 'slimmer' $N_2$ has two translational degrees of freedom in the vertical direction and along the lateral dimension of the 'slit-shaped' pore (in the direction perpendicular to paper). The cavity length a is considered to be 0.7 Å, which is the difference between $N_2$ molecule width 3.09 Å and the pore size 3.8 Å. In contrast, $CH_4$ can only have one translational degree of freedom along the lateral dimension of the slit-shaped pore at certain configurations with minimal projected length in the vertical direction, like the one shown on the right in FIG. 12(c), but no translational degree of freedom in the vertical direction due to its larger width vs. $N_2$. Moreover, subtle changes in the configuration may cause it to lose its single translational degree of freedom. For example, if the projected length in vertical direction in FIG. 12(c) is the same as the 'slit-shaped' pore size in some configurations, $CH_4$ would be stuck in it and could not freely translate or rotate. Thus the translational degree of freedom for $CH_4$ is believed to be either 1 or 0, depending on its configuration in the activated state. The rotational degrees of freedom of both penetrants are shown in FIG. 12 (c). Clearly, $N_2$ can rotate freely around the vertical axis, since its width is much smaller than the size of the pore. Moreover, $N_2$ can also tilt ~45° around the axis perpendicular to paper in the activated state as shown in the middle in FIG. 12(c), which is approximately considered to be another ¼ rotational degree of freedom (considering it can rotate 90° out of 360°). On the other hand, due to its relative large size in such a highly confined ultramicropore, $CH_4$ can only have one rotational degree of freedom around the vertical axis at certain configurations, like the one shown on the right in FIG. 12(c). A subtle change in the configuration would also make it impossible to rotate around this axis, as noted above. Thus the rotational degree of freedom for $CH_4$ is believed to be either 1 or 0, depending on its configuration in the activated state. The vibration of both penetrants is believed to be unrestricted in both normal and activated state. With the above discussion, the $N_2$/$CH_4$ entropic diffusion selectivity at 35° C. is calculated to be 51.9 if the translational and rotational degrees of freedom for $CH_4$ in the activated state are both 0, while it is 5.5 when these two degrees of freedom for $CH_4$ are both 1. With $CH_4$ having different configurations in the activated state, the averaged entropic diffusion selectivity in the illustrated ultramicropore of size 3.8 Å will be between 5.5 and 51.9. Clearly, in a situation where there is some distribution in the slit dimension, $d_c$ in FIG. 1(c), the case is complex. The $N_2$/$CH_4$ entropic diffusion selectivity obtained from experiment, which is 23.6, lies in the range calculated above, suggesting that the average ultramicropore size in the 800° C. CMS membrane is very close to the size of $CH_4$. As a result, this membrane material can effectively distinguish the size and shape difference between $N_2$ and $CH_4$ and perform strong molecular sieving effect.

The best performing 800° C. pyrolyzed CMS dense film was also tested with a most demanding case of 20% $N_2$ 80% $CH_4$ mixed gas feed to approach the real natural gas separation condition. The total feed pressure was 100 psia and the stage cut was maintained at <1%. The steady state mixed gas permeation results are summarized in Table 8, with comparison to the pure gas permeation results and predicted mixed gas permeation results based on pure gas permeation and sorption test. The measured mixed gas permeation properties were obtained from feed stream and permeate stream compositions obtained from GC and the partial feed pressure of each gas, using Eq. (1) and (6). The predicted mixed gas permeation properties were obtained from the following equations, assuming only sorption competition between $N_2$ and $CH_4$.

$$P_A = \frac{D_A C'_{HA} b_A}{1 + b_A p_A + b_B p_B} \quad (25)$$

$$P_B = \frac{D_B C'_{HB} b_B}{1 + b_A p_A + b_B p_B} \quad (26)$$

$$\alpha_{A/B} = \frac{P_A}{P_B} = \frac{D_A C'_{HA} b_A}{D_B C'_{HB} b_B} \quad (27)$$

TABLE 8

Comparison of pure and mixed gas permeation performance of 800° C. CMS dense film

| | $P_{N_2}$ (Barrer) | $P_{CH_4}$ (Barrer) | $P_{N_2}/P_{CH_4}$ |
| --- | --- | --- | --- |
| Pure gas | 6.78 | 0.88 | 7..69 |
| Predicted mixed gas | 3.57 | 0.71 | 5.12 |
| Measured mixed gas | 5.17 | 0.87 | 5.94 |

It was seen that both the permeabilities and $N_2$ /$CH_4$ mixed gas selectivity (or separation factor) decreased, compared to pure permeation data. This is because that the complicated competition between the two gases slows down the permeation of both, leading to lower permeabilities. Also, $CH_4$ takes advantage of its stronger sorption affinity in the competition. With its higher Langmuir affinity constant, $CH_4$ can occupy sorption sites available to $N_2$ under pure gas condition; thereby resulting in a lower $N_2$ /$CH_4$ mixed gas selectivity. This fact notwithstanding, the mixed gas separation performance is well estimated by the pure gas permeation tests. For less challenging, but still realistic feeds with higher $N_2$ composition (e.g. 40% $N_2$), the $CH_4$ competition would be less significant, and the $N_2$ permeability would be expected to be even closer to the pure gas value.

The following publications in their entireties are hereby incorporated by reference into this application as if fully set forth herein in order to more fully describe the state of the art to which the disclosed matter pertains.

K. A. L. Ankur Jariwala, Nitrogen-Regjecting Membranes to Increase Gas Heating Value: A Simple Wellhead Approach, 2008.

W. J. Koros, G. K. Fleming, Journal of Membrane Science 83 (1993) 1-80.

M. R. Kaaeid A. Lokhandwala, Hans Wijmans, Richard W. Baker, Nitrogen Removal From Natural Gas using membranes, Membrane Technology and Research, Inc.

T. H. Kim, W. J. Koros, G. R. Husk, K. C. O'Brien, Journal of Applied Polymer Science 34 (1987) 1767-1771.

L. M. Robeson, Journal of Membrane Science 320 (2008) 390-400.

A. Singh, Membrane materials with enhanced selectivity: an entropic interpretation, University of Texas at Austin, 1997.

V. C. Geiszler, Polyimide precursors for carbon molecular sieve membranes, University of Texas at Austin, 1997.

W. J. K. De Q. Vu, Stephen J. Miller, Industrial & Engineering Chemistry Research 41 (2001) 367-380.

M. Kiyono, P. J. Williams, W. J. Koros, Carbon 48 (2010) 4432-4441.

L. Xu, M. Rungta, M. K. Brayden, M. V. Martinez, B. A. Stears, G. A. Barbay, W. J. Koros, Journal of Membrane Science.

Tonkovich, A. L. Y., Litt, R. D., Dongming, Q., Silva, L. J., Lamont, M. J., Fanelli, M., Simmons, W. W., Perry, S., Methods for Applying Microchannels to Separate Methane Using Liquid Absorbents, Especially Ionic Liquid Absorbents from a Mixture Comprising Methane and Nitrogen, U.S. Pat. No. 8,029,604, Aug. 1, 2008.

Landrum, J. M., Russell, R. J., Agee, K., LeViness, S., Process to Remove Nitrogen andor Carbon Dioxide from Methane-containing Streams, U.S. Pat. No. 7,314,503, Dec. 3, 2004.

Kuznicki, S. M., Bell, V. A., Petrovic, I., Blosser, P. W., Separation of Nitrogen form Mixtures thereof with Methane Utilizing Barium Exchanged ETS-4, U.S. Pat. No. 5,989,316, Dec. 22, 1997.

Baker, R. W., Lokhandwala, K. A., Pinnau, I., Segelke, S., MethaneNitrogen Separation Process, U.S. Pat. No. 5,669,958, Sep. 23, 1997.

Paradowski, H., Mangin, C., Blanc, C., Process for Denitrogenation of a Feedstock of a Liquefied Mixture of Hydrocarbons Consisting Chiefly of Methane and Containing at Least 2 mol % of Nitrogen, U.S. Pat. No. 5,421,165, Apr. 29, 1993.

Handley, J. R., Separation of Nitrogen and Methane with residue Turboexpansion, U.S. Pat. No. 5,041,149, Oct. 18, 1990.

Saunders, J. B., Maloney, J. J., Methane Recovery Process for the Separation of Nitrogen and Methane, U.S. Pat. No. 5,026,408, Jun. 25, 1991.

Phade, R. F., Handley, J. R., Cryogenic Rectification Process for Separating Nitrogen and Methane, U.S. Pat. No. 4,878,932, Mar. 21, 1988.

Pande, R. F., Maloney, J. J., Handley, J. R., Process to Separation Nitrogen and Methane, U.S. Pat. No. 4,664,686, Feb. 7, 1986.

Pahade, R. F., Saunders, J. B., Maloney, J. J., Process for Separating Methane and Nitrogen, U.S. Pat. No. 4,592,767, May 29, 1985.

Yearout, J. D., Nitrogen-methane Separation Process and System, U.S. Pat. No. 4,158,556, Apr. 11, 1977.

Robeson L M. The upper bound revisited. J Membr Sci. 2008; 320(1-2):390-400.

Steel K M, Koros W J. An investigation of the effects of pyrolysis parameters on gas separation properties of carbon materials. Carbon. 2005; 43(9):1843-56.

Kiyono M, Williams P J, Koros W J. Effect of pyrolysis atmosphere on separation performance of carbon molecular sieve membranes. J Membr Sci. 2010; 359(1-2):2-10.

Kiyono M, Williams P J, Koros W J. Effect of polymer precursors on carbon molecular sieve structure and separation performance properties. Carbon. 2010; 48(15): 4432-41.

Xu L, Rungta M, Brayden M K, Martinez M V, Stears B A, Barbay G A, et al. Olefins-selective asymmetric carbon molecular sieve hollow fiber membranes for hybrid membrane-distillation processes for olefinparaffin separations. J Membr Sci. 423-424(15):314-23

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

We claim:

1. A method for decreasing the nitrogen content of a nitrogen/methane gas mixture, comprising
    contacting the nitrogen/methane gas mixture with a gas separation membrane, and
    separating a nitrogen-enriched gas stream and a nitrogen-depleted gas stream at the membrane;
    wherein the gas separation membrane comprises a carbon molecular sieve having a nitrogen/methane selectivity of at least 6.0 and a nitrogen permeability of at least 3.0 Barrers at 35° C. and 65 psia in pure nitrogen and pure methane streams.

2. The method of claim 1, wherein the nitrogen permeability is at least 4 Barrers.

3. The method of claim 2, wherein the nitrogen permeability is at least 5 Barrers.

4. The method of claim 3, wherein the nitrogen selectivity is at least 6.5.

5. The method of claim 3, wherein the nitrogen permeability is at least 6 Barrers.

6. The method of claim 5, wherein the nitrogen selectivity is at least 7.0.

7. The method of claim 1, wherein the carbon molecular sieve is a pyrolyzed polyimide, the polyimide having at least about 60 wt % carbon content and a hydrogen content of less than about 5% wt.

8. The method of claim 7, wherein the polyimide is selected from

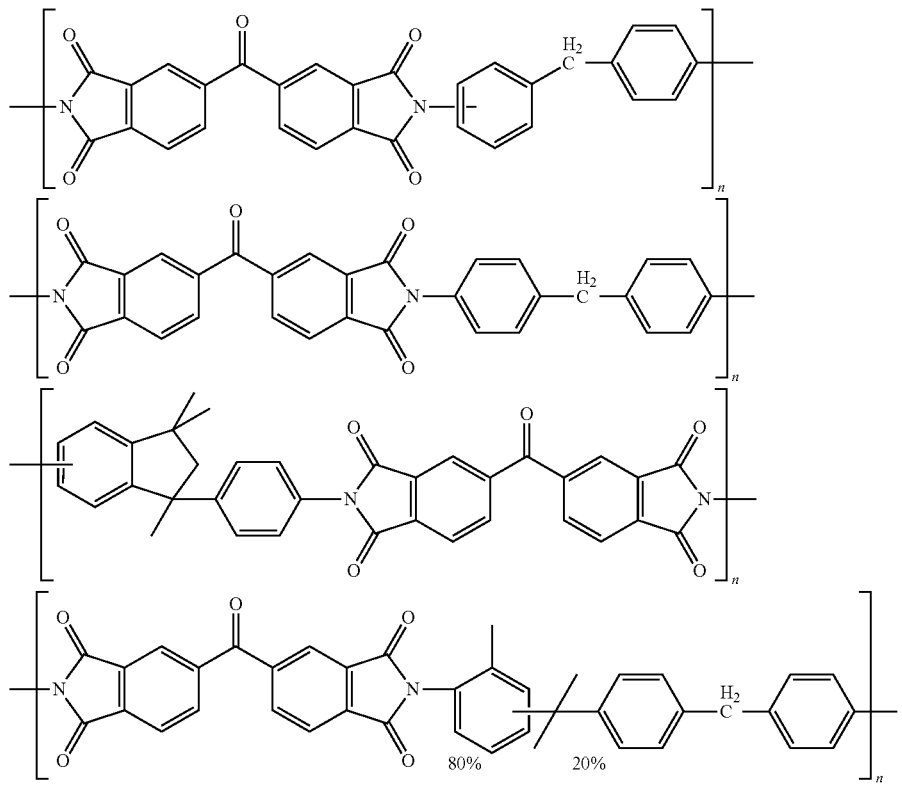

or any combination thereof as a polymer blend or copolymer.

9. The method of claim 7, wherein the polyimide is pyrolyzed at a temperature of at least 800 ° C.

10. The method of claim 9, wherein the polyimide is pyrolyzed in an inert atmosphere.

11. The method of claim 7, wherein the polyimide does not contain fluorine.

* * * * *